(12) United States Patent
Wilhelmsson et al.

(10) Patent No.: US 12,224,868 B2
(45) Date of Patent: Feb. 11, 2025

(54) MULTI-LAYER TRANSMISSION TECHNIQUE

(71) Applicant: Telefonaktiebolaget LM Ericsson (publ), Stockholm (SE)

(72) Inventors: Leif Wilhelmsson, Lund (SE); Saeedeh Moloudi, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 542 days.

(21) Appl. No.: 17/428,417

(22) PCT Filed: Feb. 14, 2020

(86) PCT No.: PCT/EP2020/053932
§ 371 (c)(1),
(2) Date: Aug. 4, 2021

(87) PCT Pub. No.: WO2020/165424
PCT Pub. Date: Aug. 20, 2020

(65) Prior Publication Data
US 2022/0149998 A1  May 12, 2022

Related U.S. Application Data

(60) Provisional application No. 62/899,044, filed on Sep. 11, 2019, provisional application No. 62/805,587, filed on Feb. 14, 2019.

(51) Int. Cl.
*H04L 1/1825* (2023.01)
*H04L 1/00* (2006.01)
(Continued)

(52) U.S. Cl.
CPC ...... *H04L 1/1825* (2013.01); *H04L 1/0003* (2013.01); *H04L 1/0009* (2013.01);
(Continued)

(58) Field of Classification Search
CPC ... H04L 1/1825; H04L 1/0003; H04L 1/0009; H04L 1/0086; H04L 1/1819;
(Continued)

(56) References Cited

U.S. PATENT DOCUMENTS 8,064,394 B2   11/2011  Jongren et al.
2001/0028684 A1*  10/2001  Chung ............... H04L 1/0058
                                                    375/261
(Continued)

FOREIGN PATENT DOCUMENTS

CN   102318282 A   1/2012
EP   2424152 A1   2/2012
(Continued)

*Primary Examiner* — Jael M Ulysse
(74) *Attorney, Agent, or Firm* — COATS & BENNETT, PLLC

(57) ABSTRACT

A technique for performing a multi-layer transmission from a transmitting station to a receiving station on a radio frequency is described. The multi-layer transmission comprises multiple layers (902, 904) having different robustnesses on the radio frequency. As to a method aspect of the technique, a first portion (802.1) of first data (802) and a first portion (804.1) of second data (804) on a first layer (902) of the multi-layer transmission and, simultaneously on a second layer (904) of the multi-layer transmission, a second portion (802.2) of the first data (802) and a second portion (804.2) of the second data (804) are transmitted.

20 Claims, 17 Drawing Sheets

(51) Int. Cl.
*H04L 1/1812* (2023.01)
*H04L 1/1822* (2023.01)
*H04L 1/1829* (2023.01)
*H04L 27/34* (2006.01)

(52) U.S. Cl.
CPC .......... *H04L 1/0086* (2013.01); *H04L 1/1819* (2013.01); *H04L 1/1822* (2013.01); *H04L 1/1845* (2013.01); *H04L 1/1864* (2013.01); *H04L 27/3405* (2013.01); *H04L 27/3488* (2013.01)

(58) Field of Classification Search
CPC ... H04L 1/1822; H04L 1/1845; H04L 1/1864; H04L 27/3405
See application file for complete search history.

(56) References Cited

U.S. PATENT DOCUMENTS

| | | | | |
|---|---|---|---|---|
| 2003/0118123 | A1* | 6/2003 | Hudson | H04L 1/1893 375/295 |
| 2003/0156659 | A1* | 8/2003 | Hanaoka | H04L 1/0047 375/261 |
| 2004/0136393 | A1* | 7/2004 | Riveiro Insua | H04B 3/54 370/432 |
| 2004/0170430 | A1* | 9/2004 | Gorokhov | H04L 1/0618 398/41 |
| 2005/0197065 | A1* | 9/2005 | Tamaki | H04L 1/0009 455/42 |
| 2005/0220211 | A1* | 10/2005 | Shim | H04L 1/06 375/267 |
| 2006/0045062 | A1* | 3/2006 | Gorokhov | H04L 1/0618 370/465 |
| 2006/0280272 | A1* | 12/2006 | Stojanovic | H04L 7/0331 375/355 |
| 2007/0183533 | A1* | 8/2007 | Schmidl | H04L 1/0003 375/267 |
| 2007/0223422 | A1 | 9/2007 | Kim et al. | |
| 2008/0080641 | A1* | 4/2008 | Kim | H04L 5/0023 375/299 |
| 2008/0151804 | A1* | 6/2008 | Wang | H04B 7/0689 370/312 |
| 2008/0192718 | A1* | 8/2008 | Jongren | H04B 7/0617 370/342 |
| 2010/0027697 | A1* | 2/2010 | Malladi | H04L 1/0656 375/295 |
| 2010/0067616 | A1* | 3/2010 | Chun | H04B 7/0639 375/295 |
| 2010/0322350 | A1* | 12/2010 | Malladi | H04B 7/0491 375/299 |
| 2011/0033001 | A1* | 2/2011 | Roh | H04L 1/0009 375/260 |
| 2011/0080877 | A1 | 4/2011 | Nentwig | |
| 2011/0142001 | A1* | 6/2011 | Ko | H04B 7/0678 370/329 |
| 2011/0170575 | A1* | 7/2011 | Harrison | H04B 7/0697 375/E1.002 |
| 2012/0082259 | A1 | 4/2012 | Yue et al. | |
| 2012/0213112 | A1* | 8/2012 | Olgaard | H04L 43/00 370/252 |
| 2012/0250785 | A1* | 10/2012 | Vidal | H03M 13/251 375/295 |
| 2013/0010745 | A1 | 1/2013 | Ko et al. | |
| 2013/0242920 | A1 | 9/2013 | Wang et al. | |
| 2014/0044206 | A1* | 2/2014 | Nammi | H04B 7/0417 375/267 |
| 2014/0247900 | A1* | 9/2014 | Maes | H04L 27/2626 375/295 |
| 2015/0098423 | A1 | 4/2015 | Porat et al. | |
| 2016/0013897 | A1* | 1/2016 | Sun | H04L 27/2607 370/312 |
| 2016/0204873 | A1* | 7/2016 | Perez De Aranda Alonso | H04L 1/0058 398/186 |
| 2016/0285525 | A1* | 9/2016 | Budianu | H04L 5/0057 |
| 2017/0041024 | A1* | 2/2017 | Chang | H03M 13/6508 |
| 2017/0126376 | A1* | 5/2017 | Wang | H04L 5/006 |
| 2017/0265060 | A1* | 9/2017 | Bin Sediq | H04L 5/0053 |
| 2017/0288936 | A1* | 10/2017 | Park | H04L 27/32 |
| 2017/0339691 | A1 | 11/2017 | ELArabawy et al. | |
| 2017/0373789 | A1* | 12/2017 | Huang | H04B 7/0632 |
| 2018/0013526 | A1* | 1/2018 | Bayesteh | H04L 27/34 |
| 2018/0026757 | A1* | 1/2018 | Chung | H04W 72/046 370/328 |
| 2018/0091765 | A1* | 3/2018 | Mobasher | H04L 1/0017 |
| 2018/0102877 | A1* | 4/2018 | Jiang | H04B 7/0473 |
| 2018/0262382 | A1* | 9/2018 | Manolakos | H04L 27/2646 |
| 2018/0324007 | A1* | 11/2018 | Nammi | H04L 25/03929 |
| 2018/0375616 | A1* | 12/2018 | Beale | H04L 1/08 |
| 2019/0150132 | A1* | 5/2019 | Bala | H04W 72/541 370/329 |
| 2019/0199415 | A1* | 6/2019 | Zhu | H04L 1/06 |
| 2019/0215133 | A1* | 7/2019 | Pan | H04L 27/3488 |
| 2019/0372810 | A1* | 12/2019 | Sun | H04L 27/38 |
| 2020/0195828 | A1* | 6/2020 | Reyserhove | H04N 25/535 |
| 2020/0228174 | A1* | 7/2020 | Nam | H04L 5/005 |
| 2020/0259599 | A1* | 8/2020 | Zhang | H04L 1/1864 |
| 2020/0389345 | A1* | 12/2020 | Onggosanusi | H04L 1/0061 |
| 2021/0227472 | A1* | 7/2021 | Liu | H04W 52/08 |

FOREIGN PATENT DOCUMENTS

| | | | | |
|---|---|---|---|---|
| WO | WO-2008031359 | A1 * | 3/2008 | ............. H04B 7/043 |
| WO | 2009129612 | A1 | 10/2009 | |
| WO | WO-2018009548 | A1 * | 1/2018 | ........... H04L 1/0003 |
| WO | 2019192684 | A1 | 10/2019 | |

* cited by examiner

300

| Transmit, on a first layer of a multi-layer transmission, a first portion of first data and a first portion of second data and, simultaneously on a second layer of the multi-layer transmission, a second portion of the first data and a second portion of the second data | — 302 |

↓

| Receive a feedback message from the receiving station in response to the transmission, wherein optionally sizes of first and second portions depend on or are changed responsive to the feedback message | — 304 |

↓

| Retransmit, to the receiving station, in response to the feedback message, a portion of the first data using at least one of the first layer and the second layer of the multi-layer transmission | — 306 |

| Receive, on a first layer of a multi-layer transmission, a first portion of first data and a first portion of second data and, simultaneously on a second layer of the multi-layer transmission, a second portion of the first data and a second portion of the second data | — 402 |

↓

| Transmit a feedback message to the transmitting station in response to the reception, wherein optionally sizes of first and second portions depend on or are changed responsive to the feedback message | — 404 |

↓

| Receive a retransmission, from the transmitting station, in response to the feedback message, of a portion of the first data using at least one of the first layer and the second layer of the multi-layer transmission | — 406 |

MULTI-LAYER TRANSMISSION TECHNIQUE

TECHNICAL FIELD

The present disclosure relates to a technique for multi-layer radio transmission. More specifically, and without limitation, methods and devices for layer-selection or layer-distribution in a multi-layer transmission comprising multiple layers having different robustnesses are provided.

BACKGROUND

In an existing transmitter or transceiver, codewords from HARQ processes can be mapped or assigned to various layers in the sense of different spatial streams for transmission and/or retransmission of information on a radio channel. The document US 2008/0192718 A1 describes embodiments that provide for various mappings, which facilitate, for example, HARQ processes. For example, a codeword can be mapped onto a plurality of such spatial layers, which are equal in number to a channel rank of a radio channel to be used for the transmission.

Besides licensed radio bands, there is an increased interest in using unlicensed radio bands such as the industrial, scientific and medical (ISM) radio bands at 2.45 GHz and the 5 GHz radio bands for cellular and machine-type communications. To ensure co-existence between different radio devices using a certain standard as well as between radio devices using different standards, some kind of co-existence mechanism is employed for accessing such shared radio frequencies. One commonly used co-existence mechanism includes a listen-before-talk (LBT) procedure, which is also known as carrier sense multiple access with collision avoidance (CSMA/CA). Collisions are avoided by only initiating a transmission when the channel is not already used from the perspective of the potential transmitter. Effectively, a radio device that intends to transmit on the radio frequency senses the channel and determines whether the channel is busy (i.e., in use or occupied) or idle (i.e., unoccupied). If the channel is determined to be busy, the transmission is deferred, whereas if the channel is determined to be idle, the transmission is initiated. While CSMA/CA works well if interference at the transmitter and the receiver are correlated, it fails if the transmitter is out of the range of the interferer.

To counter the lack of knowledge as to interference and noise at the receiver, it is common practice to use forward error correction (FEC) codes in combination with an automatic retransmission request (ARQ) to ensure that the data is correctly received. By virtue of the FEC, the information to be transmitted is encoded so that the probability of a decoding error is decreased. In the event that a decoding error occurs, the receiver transmits a negative acknowledgement (NACK) to the transmitter, which triggers a retransmission of the erroneous packet in the sense of the ARQ. Combining FEC and ARQ is commonly referred to as hybrid ARQ (HARQ). The beneficial usage of HARQ is not limited to unlicensed bands.

Since a received packet contains some information about the transmitted data even if the data could not be correctly recovered from the packet, the receiver can combine the information obtained in the initial erroneous transmission with the additional information obtained in the retransmission. This will further enhance the performance, provided the information from the initial transmission is stored and later combined with the additional information obtained from the retransmission. In this way, the decoding error is less harmful and HARQ allows for a more opportunistic use of the channel between the transmitter and the receiver, e.g., than if ARQ is used. That is, packets can be transmitted at a slightly higher data rate on average. For example, a modulation and coding rate can be higher when using HARQ compared to using ARQ.

However, when applying HARQ to an operation in unlicensed bands, aiming at a relatively high packet error ratio and relying on retransmissions may be problematic if the standard CSMA/CA protocol with exponential back-off is used, as an erroneously received packet means that the transmitter when accessing the channel for retransmission of a packet must double the size of its contention window (CW). Since this may severely degrade throughput and latency, especially in dense deployments, one may not be able to use opportunistic transmissions as desired and, thus, channel capacity is wasted.

Moreover, without limitation to an operation in unlicensed bands, every time a HARQ transmission or HARQ retransmission is correctly received, it is typically so that the channel would have allowed for even more data to be transmitted. Especially if the receiver was very close to decoding a packet correctly using the previous HARQ transmission, the HARQ retransmission of the packet carries more information than is actually needed for correct decoding. Thus, channel capacity is wasted.

When applying HARQ to situations where the receiver conditions are largely unknown for the transmitter, as often is the case for operation in unlicensed bands, a proper selection of modulation and coding scheme (MCS) is a challenge. A multi-layer HARQ transmission can achieve a gain compared to slow (e.g., feedback-based) link adaptation of the MCS.

However, given the applied MCS, the robustness of the different layers of the multi-layer transmission does not necessarily match to the amount of information that is actually needed at the receiver, e.g., to complete decoding by soft-combining. For example, even if the transmitter has knowledge as to the amount of information that is missing at the receiver, channel capacity can be wasted even when selecting the layer with the least robustness to transmit the missing amount of information, since the robustness of the layers is fixed or predetermined by the MCS.

SUMMARY

Accordingly, there is a need for a radio communication technique that uses channel capacity more efficiently, especially in unlicensed radio frequency bands and/or for HARQ transmissions. As an alternative or more specific object, there is a need for a radio communication technique that can achieve the flexibility of MCS-link adaptation without the delay and/or without the signaling overhead necessary for changing the MCS.

As to a first method aspect, a method of performing a multi-layer transmission from a transmitting station to a receiving station on a radio frequency is provided. The multi-layer transmission comprises multiple layers having different robustnesses on the radio frequency. The method comprises or initiates a step of transmitting, on a first layer of the multi-layer transmission, a first portion of first data and a first portion of second data and, simultaneously on a second layer of the multi-layer transmission, a second portion of the first data and a second portion of the second data.

In at least some embodiments, by changing the sizes of the first and second portions, the robustness of the transmission of the first data can be adjusted, preferably without changing the MCS. Same or further embodiments can select the first and second portions of the first data so that less channel capacity is wasted by not treating or using the different layers in separation. For example, the bits (preferably different bits) of a codeword can be transmitted on the different layers, namely in the first and second portions.

The same embodiments or further embodiments may control the sizes of the first and second portions for a (e.g., HARQ) retransmission (e.g., of the first data), e.g., based on an estimated or reported SNR or SINR at the receiving station.

The technique may be implemented as a multi-layer HARQ transmission to further enhance the performance.

Embodiments of the technique can fine-tune the reliability of a the first and/or the second date (e.g., a first codeword and a second codeword, respectively) such that respective data can be correctly decode and/or with only a small margin (e.g., extra information in the transmission not necessary for successful decoding) in order to use the channel resources as effectively as possible.

The first data (e.g. a set of bits representing the data) may be distributed or partitioned over two or more layers of the multi-layer transmission.

Alternatively or in addition, the receiver conditions (e.g., the SNR or SINR at the receiver) may be estimated or predicted for the next transmission, which information may be used when selecting how to perform a (e.g., HARQ) transmission or retransmission.

The technique can be implemented in combination with a multi-layer HARQ transmission that takes into account that the receiver conditions in some situations may be largely unknown. Multiple codewords may be transmitted in parallel on the different layers with different robustness. In this way, the receiver can in a straight-forward way decode as many codewords as the channel conditions allow. Specifically, also in case the channel is relatively poor, some codewords can typically be correctly received.

The method may further comprise or initiate a step of transmitting first data of a first hybrid automatic repeat request (HARQ) process on a first layer of the multi-layer transmission simultaneously with second data of a second HARQ process on a second layer of the multi-layer transmission.

In at least some embodiments, the multi-layer transmission of data (e.g., data packets or pieces thereof) of different HARQ processes on different layers allows assigning specific portions of a mutual information or a channel capacity to the different HARQ processes, e.g., since the different layers have different robustnesses. The layers or mutual information may be assigned to the different HARQ processes depending on a state of the respective HARQ process, e.g., since the respective data of different HARQ processes is transmitted in a layered fashion with different and/or varying robustnesses for the different layers. The state of the respective HARQ process may be the amount of outstanding information to successfully decode the data of the respective HARQ process at the receiving station.

Herein, assigning mutual information may be implemented by assigning the bits to layers expected to support a certain amount of mutual information.

Same or further embodiments may perform an opportunistic transmission on the radio frequency, e.g., without knowledge of a receiver channel condition (e.g., the receiver condition) at the time of formatting or initially transmitting the data packet, e.g., by trying to match the portion of information that is additionally required for successfully decoding the data packet to a specific layer of the multi-layer transmission that is expected to correspond to the required amount of additional information.

Herein, an opportunistic use of the radio frequency or an opportunistic transmission on the radio frequency may encompass transmitting data even if the data is not decoded correctly after the initial transmission, so that the initial transmission is still useful in providing some information that can be used for one or more successive (e.g., HARQ) re-transmissions. Alternatively or in addition, the transmission of data (e.g., a packet) may be opportunistic if under best or optimistic channel conditions the data is decodable, while these best or optimistic channel conditions are occasionally or intermittently not present. It may still be better on average to perform opportunistic transmission than using a more conservative or more robust modulation and coding scheme (MCS). Even if the best or optimistic channel conditions are not present (e.g., so that the packet will not be correctly decoded), the transmission still enables the receiver to extract some information so the cost for this not yet successful transmission is relatively low.

Herein, being decodable at a certain SNR or SINR may encompass being expected to be decodable at said SNR or SINR.

The multiple layers may be transmitted on the radio frequency simultaneously and co-directionally. That is, the first layer and the second layer may be transmitted using the same temporal radio resource (e.g., the same symbol), the same spatial radio resources (e.g., the same spatial stream or beam) and/or the same frequency radio resources (e.g., the same radio frequency). For example, the different layers of the multi-layer transmission may be combined into one antenna signal. The one antenna signal may be transmitted in the multi-layer transmission with or without spatial precoding.

The multiple layers may be sent concurrently.

The multiple layers may be used both for uplink (UL) and downlink (DL).

Preferably, the number of layers of the multi-layer transmission may depend on the selected modulation and/or may be unrelated with the rank of the channel.

The first data may be a first codeword. The second data may be a second codeword other than the first codeword.

The first data may be or may comprise data of a first hybrid automatic repeat request (HARQ) process. The second data may be or may comprise data of a second HARQ process other than the first HARQ process.

Alternatively or in addition, the first data may be or may comprise data of a first automatic repeat request (ARQ) process. The second data may be or may comprise data of a second ARQ process other than the first ARQ process.

The first portion of the first data and the second portion of the first data may be complementary portions of the first data. Alternatively or in addition, the first portion of the second data and the second portion of the second data may be complementary portions of the second data.

The first data may be or may correspond to a combination of the first portion of the first data and the second portion of the first data. Alternatively or in addition, the second data may be or may correspond to a combination of the first portion of the second data and the second portion of the second data.

A size of at least one of the first portion of the first data, the second portion of the first data, the first portion of the second data, and the second portion of the second data may depend on at least one of a signal to noise ratio (SNR) and a signal to interference and noise ratio (SINR) at the receiving station.

A size of the first or second portion of the first data relative to a total size of the first data and/or a size of the first or second portion of the second data relative to a total size of the second data may depend on at least one of a SNR and a SINR at the receiving station.

At least one or each of the size or sizes may depend monotonically and/or linearly on the SNR or the SINR, preferably on a logarithmic scale or in decibel (dB), optionally in combination with a discretization.

The transmission on the first layer may be decodable at the receiving station if a SNR or a SNIR at the receiving station is greater than a first threshold value. The transmission on the second layer may be decodable at the receiving station if the SNR or the SNIR at the receiving station is greater than a second threshold value that is greater than the first threshold value.

The size of the second portion of the first data may be or may tend to be zero if the SNR or the SINR is or tends to be equal to the first threshold value. The size of the second portion of the first data may monotonically and/or linearly increase as a function of the SNR or the SINR being greater than the first threshold value and/or less than the second threshold value. Alternatively or in addition, the size of the first portion of the first data may be or may tend to be zero if the SNR or the SINR is or tends to be equal to the second threshold value. The size of the first portion of the first data may monotonically and/or linearly decrease as a function of the SNR or the SINR being greater than the first threshold value and/or less than the second threshold value.

The SNR or the SINR at the receiving station may be at least one of estimated by the transmitting station and reported by the receiving station.

The first portion of the first data may correspond to or may be represented by M bits. The second portion of the first data may correspond to or may be represented by N bits. The first portion of the second data may correspond to or may be represented by N bits. The second portion of the second data may correspond to or may be represented by M bits.

The method may further comprise or initiate a step of encoding a first data unit, preferably for the first HARQ process. The first data may comprise a first codeword resulting from the encoding of the first data unit. Alternatively or in addition, the method may further comprise or initiate a step of encoding a second data unit, preferably for the second HARQ process. The second data may comprise a second codeword resulting from the encoding of the second data unit.

A size of at least one or each of the first codeword and second codeword may be M+N bits.

The transmitting may further comprise transmitting, on the first layer of the multi-layer transmission, a first portion of third data and, simultaneously on the second layer of the multi-layer transmission, a second portion of the third data and, simultaneously on a third layer of the multi-layer transmission, a third portion of the first data and a third portion of the second data and a third portion of the third data.

The first data may be a first codeword. The second data may be a second codeword other than the first codeword. The third data may be a third codeword other than both the first codeword and the second codeword.

The first data may be or may comprise data of a first HARQ process. The second data may be or may comprise data of a second HARQ process other than the first HARQ process. The third data may be or may comprise data of a third HARQ process other than both the first HARQ process and the second HARQ process.

The first, second and third portions of the first data may be complementary portions of the first data. Alternatively or in addition, the first, second and third portions of the second data may be complementary portions of the second data. Alternatively or in addition, the first, second and third portions of the third data may be complementary portions of the third data.

The first data may be or may correspond to a combination of the first, second and third portions of the first data. Alternatively or in addition, the second data may be or may correspond to a combination of the first, second and third portions of the second data. Alternatively or in addition, the third data may be or may correspond to a combination of the first, second and third portions of the third data.

A size of at least one of the first, second and third portions of the first data, the first, second and third portions of the second data, and the first, second and third portions of the third data may depend on at least one of a SNR and a SINR at the receiving station.

A size of the first, second or third portion of the first data relative to a total size of the first data and/or a size of the first, second or third portion of the second data relative to a total size of the second data and/or a size of the first, second or third portion of the third data relative to a total size of the third data may depend on at least one of a SNR and a SINR at the receiving station. At least one or each of the size or sizes may depend monotonically and/or linearly on the SNR or the SINR, preferably on a logarithmic scale or in dB, optionally in combination with a discretization.

The transmission on the first layer may be decodable at the receiving station if a SNR or a SNIR at the receiving station is greater than a first threshold value. Alternatively or in addition, the transmission on the second layer may be decodable at the receiving station if the SNR or the SNIR at the receiving station is greater than a second threshold value that is greater than the first threshold value. Alternatively or in addition, the transmission on the third layer may be decodable at the receiving station if a SNR or a SNIR at the receiving station is greater than a third threshold value that is greater than the second threshold value.

The sizes of the second and third portions of the first data may be or may tend to be zero if the SNR or the SINR is or tends to be equal to the second threshold value. Each of the sizes of the second and third portions of the first data may be monotonically and/or linearly increasing as a function of the SNR or the SINR being greater than the second threshold value and/or less than the third threshold value. The size of the first portion of the first data may be or may tend to be zero if the SNR or the SINR is or tends to be equal to the third threshold value. The size of the first portion of the first data may monotonically and/or linearly decrease as a function of the SNR or the SINR being greater than the second threshold value and/or less than the third threshold value.

Each of the first portion of the first data, the second portion of the second data and the third portion of the third data may correspond to or may be represented by M' bits. Each of the second and third portions of the first data, the first and third portions of the second data, and the first and second portions of the third data may correspond to or may be represented by N' bits.

The size of the third portion may be or may tend to zero, e.g. if the first threshold value is less than the SNR and/or the SNR is less than the second threshold value.

The size of the second and third portions may be or may tend to zero, e.g., if the SNR is less than the first threshold value.

In an extreme case, the first, second and third data may be equally split over first, second and third layer.

The method may further comprise or initiate a step of encoding a first data unit, preferably for the first HARQ process, the first data comprising a first codeword resulting from the encoding of the first data unit. Alternatively or in addition, the method may further comprise or initiate a step of encoding a second data unit, preferably for the second HARQ process, the second data comprising a second codeword resulting from the encoding of the second data unit. Alternatively or in addition, the method may further comprise or initiate a step of encoding a third data unit, preferably for the third HARQ process, the second data comprising a third codeword resulting from the encoding of the third data unit.

A size of at least one or each of the first codeword and second codeword may be M'+2·N' bits.

The method may be implemented for the cases of more layers.

The transmission of the first data may be an initial transmission or a retransmission, preferably of the first HARQ process. Alternatively or in addition, the transmission of the second data may be an initial transmission or a retransmission, preferably of the second HARQ process. Alternatively or in addition, the transmission of the third data may be an initial transmission or a retransmission, preferably of the third HARQ process.

The method may further comprise or initiate a step of receiving a feedback message from the receiving station, preferably in response to the transmission or a previous multi-layer transmission from the transmitting station to the receiving station on the radio frequency. The feedback message may be indicative of at least one of the SNR and the SINR at the receiving station.

A size of the first portion of the first data and a size of the second portion of the first data may be determined or changed by increasing the size of one and decreasing the size of the other depending on the feedback message from the receiving station.

The feedback message may be indicative of how close the receiving station is to successfully decoding at least one or each of the first data, the second data and the third data or an amount of information estimated or required for successfully decoding at least one or each of the first data, the second data and the third data. Alternatively or in addition, the feedback message may comprise a soft acknowledgment that is indicative of a state between a positive acknowledgment and a negative acknowledgment for at least one or each of the first data, the second data and the third data.

The method may further comprise or initiating a step of, depending on and/or responsive to the feedback message, partitioning the first data in at least two of the first portion, the second portion and the third portion of the first data and/or partitioning the second data in at least two of the first portion, the second portion and the third portion of the second data and/or partitioning the third data in at least two of the first portion, the second portion and the third portion of the third data.

The method may further comprise or initiating a step of, if the feedback message is indicative that decoding of the first data was not successful by an amount of missing information or if the feedback message is indicative of a non-positive or negative acknowledgment (NACK) for the first data wherein an amount of missing information for successfully decoding of the first data being estimated based the SNR or the SINR, retransmitting, to the receiving station in response to the feedback message, a portion of the first data using at least one of the first layer, the second layer and the third layer of the multi-layer transmission, optionally wherein a combination of a size of the retransmitted portion and a robustness of the used layer corresponds to or matches the amount of missing information.

In order to correspond to or match the given amount of missing information, the size of the retransmitted portion may be greater when using a less robust layer for the retransmission compared to the size of the retransmitted portion when using a more robust layer for the retransmission.

The size of the retransmitted portion may depend on a code used for encoding a first data unit resulting in the first data. The code may be an error-correction code. The size of the retransmitted portion when using a convolutional code may be greater than the size of the retransmitted portion when using a low-density parity-check (LDPC) code.

The size of the retransmitted portion may correspond to or may depend on a code length or a correlation length of the code used for encoding a first data unit resulting in the first data.

The method may further comprise or initiating a step of estimating the amount of missing information for successfully decoding of the first data based on the SNR or the SINR compared to at least one of the first threshold value, the second threshold value, and the third threshold value. For example, the amount of missing information is estimated based on a difference between the SNR or the SINR and at least one of the first threshold value, the second threshold value, and the third threshold value.

The retransmitted portion may comprise or may be based on the second portion of the first data. Alternatively or in addition, the size of the retransmitted portion may be equal to or less than the size of the second portion of the first data, if the SNR or the SNIR is greater than the first threshold value and/or less than the second threshold value. Optionally, the retransmission uses the first layer.

The size of the retransmitted portion may be or may tend to be zero if the SNR or the SINR is or tends to be equal to the second threshold value. The size of the retransmitted portion may monotonically and/or linearly decrease as a function of the SNR or the SINR being greater than the first threshold value and/or less than the second threshold value.

The retransmitted portion may comprise or may be based on the third portion of the first data. Alternatively or in addition, the size of the retransmitted portion may be equal to or less than the size of the third portion of the first data, if the SNR or the SNIR is greater than the second threshold value and/or less than the third threshold value. Optionally, the retransmission uses at least one of the first layer and the second layer.

The size of the retransmitted portion may be or may tend to be zero if the SNR or the SINR is or tends to be equal to the second third value. The size of the retransmitted portion may monotonically and/or linearly decrease as a function of the SNR or the SINR being greater than the second threshold value and/or less than the third threshold value.

The second data, preferably the second portion of the second data, may be equal to or redundant relative to or comprised in the first data, preferably the first portion of the first data. The second data may be redundant relative to the first data if the second data comprises portions (i.e., one or more bits) of the first data.

The second portion of the second data and the first portion of the first data may be redundant, equivalent or equal. The multi-layer transmission may comprise the redundant, equivalent or equal data or portions if the SNR or the SINR is less than the first threshold value.

The third data, preferably the third portion of the third data, may be equal to or redundant to or comprised in the second data, preferably the second portion of the second data. The third portion of the third data and the second portion of the second data may be redundant, equivalent or equal. The multi-layer transmission may comprise the redundant, equivalent or equal data or portions if the SNR or the SINR is greater than the first threshold value and/or less than the second threshold value.

The multi-layer transmission on the radio frequency may be subject to an access protocol for shared access to the radio frequency. The access protocol may comprise a back-off mechanism for deferring the multi-layer transmission based on a contention window, which is maintained or not increased if the feedback message from the receiving station is indicative of a positive acknowledgement for at least one of the first data, the second data, and the third data.

Code rates used for the different layers may be different.

The different robustnesses of the multiple layers may correspond to different portions of a mutual information between the transmitting station and the receiving station. E.g., if the i-th layer (e.g., i=1, 2) of the multi-layer transmission corresponds to a mutual information of $x_i$ bits, the data of a HARQ process that requires y bits of additional information may be transmitted on the i-th layer with $y<x_i$. More specifically, the data of a HARQ process that requires y bits of additional information may be transmitted on the i-th layer with the least $x_i$ of all layers (e.g., among the first and second layers) fulfilling $y<x_i$. Using a hierarchical order of the layers of the multi-layer transmission, the data of a HARQ process that requires y bits of additional information may be transmitted on the i-th layer that fulfills $x_i>y>x_{i+1}$.

The technique may be implemented for the multi-layer transmission comprising two layers (i.e., the first and second layers) or more layers (e.g., a third layer or a fourth layer). The use of two or more layers may allow for a HARQ transmission from the transmitting station to the receiving station in which decoding of at least one of the multiple layers is successful. Consequently, there is no need to consider the transmission as erroneous or failed. Thus, no increase of a contention window (CW) is triggered, e.g., in case CSMA/CA (or any other co-existence mechanism for shared channel access) is used for accessing the radio frequency.

Alternatively or in addition, using two or more layers according to the technique may allow for an opportunistic transmission. For example, one layer (e.g., at least one layer and/or not all of the multiple layers) will not be decoded correctly and still carries information that is usable for a successive retransmission.

The radio frequency may be shared among a plurality of stations. Alternatively or in addition, the radio frequency may be in an unlicensed radio band.

The multi-layer transmission may contain at least two partial modulation symbols each associated with a different one of the multiple layers. The partial modulation symbols may be different in terms of power level or amplitude. The at least two partial modulation symbols may be combined into a modulation symbol that is transmitted in the multi-layer transmission.

A robustness of each of the multiple layers may be defined in terms of its power level or amplitude. For example, the robustness of a given layer may correspond to the (e.g., maximum or minimum) difference between modulation symbols representing different data on the given layer assuming all data on other layers is unchanged. The robustness of a respective layer of the multiple layers may correspond to a power level or amplitude used for the respective layer in the multi-layer transmission. The first layer may be the most robust layer of the multi-layer transmission, optionally with the exception of a layer dedicated to a control signal.

The transmitting station may perform the first method aspect. Alternatively or in addition, a system comprising the transmitting station and the receiving station may perform the method.

The first data and the second data may be user data. The first and second data may be transmitted under the control of the first and second HARQ processes, respectively. The "first data of a first HARQ process" may be any data that is transmitted under the control of the first HARQ processes, and/or the "second data of a second HARQ process" may be any data that is transmitted under the control of the second HARQ processes.

The multiple layers may be transmitted on the same radio frequency. The different layers may be based on a power-level division. The multi-layer transmission may use power-level division multiplexing of the first data and the second data. The layers may be referred to as layers of a hierarchical modulation. The power-level division multiplexing may be combined with at least one of time division multiplexing, frequency division multiplexing and space division multiplexing, e.g., using an antenna array at each of the transmitting station and/or the receiving station, beamforming transmission at the transmitting station, diversity combining at the receiving station and/or a MIMO channel between transmitting station and the receiving station.

The multi-layer transmission may comprise one or more modulation symbols. More than one modulation symbol may be transmitted sequentially, e.g., in a transmission time interval (TTI) and/or a transmission opportunity (TxOp).

Each modulation symbol may be composed of multiple partial modulation symbols corresponding to the multiple layers, respectively. The different robustnesses of the multiple layers may be implemented by combining (e.g., superposing, superimposing or adding) the multiple partial modulation symbols. The partial modulation symbols may be combined into one modulation symbol. For example, the partial modulation symbols may be transmitted simultaneously on the radio frequency in the same spatial stream. The different partial modulation symbols may have the different robustnesses, respectively. For example, the robustnesses of the respective partial modulation symbol may be related to an amplitude of the respective partial modulation symbol.

Alternatively or in addition, each modulation symbol may be representative of a bit string comprising multiple (e.g., disjoint) groups of bits corresponding to the multiple layers, respectively. Different groups of bits may have the different robustnesses. The different robustnesses of the multiple layers may be implemented by mapping the bit string to the modulation symbol. A group of bits having more robustness may be mapped to more of the mutual information than a bit group having less robustness. By way of example, the modulation symbol may be representative of a bit string comprising 4 bits according to Gray-coded 16-QAM. Bits 1 and 2 of the bit string may have more robustness than bits 3 and 4.

Different modulation schemes (e.g., for the partial modulation symbols of different layers) and/or different coding schemes (e.g., for encoding the data of different layers) may be used for the first data and the second data according to the different layers, respectively. For example, the combination of the first data and the second data may determine the modulation symbol in a symbol alphabet. By way of example, a size of the symbol alphabet may be equal to $2^6=64$. The partial modulation symbols for one of the first and second layers may correspond to a first partial modulation alphabet (e.g., Quadrature Phase-Shift Keying, QPSK, with 4 partial constellations). The partial modulation symbols for another one of the first and second layers may correspond to a second partial modulation alphabet (e.g., quadrature amplitude modulation with 16 partial constellations, 16-QAM).

The step of combining (e.g., superposing or adding) may comprise determining or scaling an amplitude of the respective partial modulation symbols according to respective power levels. The different power levels may correspond to scaled partial modulation alphabets or scaled partial constellations. Alternatively or in addition, the combining (e.g., superposing, superimposing or adding) may correspond to the partial modulation alphabets or partial constellations being shifted in the constellation plane according to the partial modulation symbol of the next-higher layer of the multi-layer transmission.

The layers may be ordered according to the respective power levels (e.g., by the integer index). The amplitude of each pair of consecutive layers may be scaled by a factor of 2 or more, the power level of each pair of consecutive layers may be different by a factor of 4 or more and/or the power level of each pair of consecutive layers may be different by 6 dB or more.

Each partial modulation symbol may comprise at least one of a phase and an amplitude representing the first data and the second data, respectively. The modulation scheme may comprise a set of symbol candidates (i.e., the respective partial modulation alphabet) for the respective layer. The symbol candidates in the respective partial modulation alphabet may be different in terms of at least one of the phase and the amplitude.

The transmission of the first data on the first layer may be an initial transmission of the first HARQ process. The transmission of the second data on the second layer may be a retransmission of the second HARQ process. Alternatively or in addition, the transmission of the second data on the second layer may be an initial transmission of the second HARQ process. The transmission of the first data on the first layer may be a retransmission of the first HARQ process.

The retransmission of the first or second data may use a redundancy version (RV) that is different from an initial transmission of the respective data.

The method may further comprise or initiate a step of controlling the robustnesses of the multiple layers. For example, the robustnesses of the multiple layers may be controlled by assigning a first portion of a mutual information between the transmitting station and the receiving station to the first layer and assigning a second portion of the mutual information to the second layer. The mutual information between the transmitting station and the receiving station may be partitioned in a first portion or first robustness for the first layer and a second portion or second robustness for the second layer.

The robustnesses of the multiple layers may be controlled by considering the mutual information that can be expected to be carried by the first and second layers, respectively. A layer that carries enough information (e.g., enough mutual information, and preferably not much more than is needed) to successfully decode the respective data may be used for the respective data may be used for retransmitting the respective data. The mutual information that can be carried on a layer (i.e., the corresponding portion of the mutual information between the transmitter and the receiver) may be estimated based on a signal to noise ratio (SNR) and/or a signal to interference and noise ratio (SINR).

The mutual information between the transmitting station transmitting x and the receiving station receiving y may be defined by the respective probability distributions including the joint probability distribution $P_{XY}(x,y)$:

$$I(X;Y) = \sum_{x,y} P_{XY}(x,y) \log \frac{P_{XY}(x,y)}{P_X(x)P_Y(y)}$$

The marginal probability distribution $$P_X(x) = \sum_y P_{XY}(x,y)$$

for the input corresponds to a channel coding performed at the transmitting station. A channel capacity $$C = \max_{P_X} I(X;Y)$$

between the transmitting station and the receiving station is the maximum of the mutual information (asymptotically) achievable by channel coding.

The robustnesses of the different layers may be controlled by at least one parameter of a constellation or at least one parameter of a modulation and coding scheme (MCS).

The different robustnesses of the different layers may be controlled using the constellation or the MCS. The constellation or the MCS may assign different portions of the mutual information to the first layer and the second layer according to the respective robustnesses and/or the at least one parameter.

The first layer may be related to an in-phase component and the second layer may be related to a quadrature component in the multi-layer transmission. Alternatively or in addition, the second layer may be related to the in-phase component and the first layer may be related to a quadrature component in the multi-layer transmission. That is, the in-phase component may represent the first data and the quadrature component may represent the second data, or vice versa.

The method may further comprise or initiate a step of controlling the robustnesses of the first layer and the second layer by scaling at least one of the in-phase component and the quadrature component. The different robustnesses may be controlled by a ratio between the in-phase component for the first layer and the quadrature component for the second layer in the multi-layer transmission.

The in-phase component and the quadrature component are scaled oppositely. The different portions of the mutual information may be controlled by squeezing a constellation plane spanned by an in-phase component and a quadrature component of the modulation symbol.

The in-phase component may be scaled by a factor $\sin(\alpha)$ and the quadrature component may be scaled by a factor $\cos(\alpha)$ for a parameter $\alpha$ in $[0°, 45°]$ or $[0°, 90°]$, or vice versa, i.e., the functions sin and cos may be interchanged. The parameter $\alpha$ may be an example for the at least one parameter of the constellation or the MCS.

In other terms, a power level or signal to noise ratio (SNR) of the in-phase component may be scaled by a factor $(\sin(\alpha))^2$. A power level of the quadrature-phase component may be scaled by a factor $(\cos(\alpha))^2$. More specifically, the transmit power may be independent of the parameter $\alpha$.

The method may further comprise or initiate a step of receiving a feedback message from the receiving station in response to the transmission. The robustness of at least one or each of the first layer and the second layer may depend on or may be changed responsive to the feedback message. For example, the feedback message may request a change or may determine the partitioning of the mutual information or a change of the partitioning of the mutual information.

Moreover, changing the robustness of one or more of the layers (e.g., individually or differently for each layer) responsive to the feedback message may be implemented as a link adaptation. Changing the robustness of one or more of the layers may be implemented as a link adaptation that is specific for the one or more layers or specific for the one or more HARQ processes.

The technique may be implemented without link adaptation by changing a MCS or to avoid or replace a link adaptation that is based on changing the MCS.

The feedback message may be indicative of a level of interference and/or noise at the receiving station or may comprise channel state information (CSI). The feedback message may be an acknowledgement frame, e.g., in response to the multi-layer transmission. The feedback message may relate to at least two or each of the multiple layers of the multi-layer transmission. For at least two or each of the multiple layers of the multi-layer transmission, the feedback message may be indicative of whether or not the respective data has been correctly decoded and/or the amount of information that is missing for the decoding. The feedback message may comprise a Block Acknowledgment (BA).

The feedback message may be indicative of a signal to a SNR or a SINR. The method may further comprise or initiate a step of assigning a first portion of a mutual information (between the transmitting station and the receiving station) to the first layer and/or assigning a second portion of the mutual information to the second layer. The portions of the mutual information may be estimated based on the indicated SNR and/or SINR to correspond to the amount of information that is missing to successfully decode at least one or each of the first data and the second data.

The robustness of the first layer and the robustness of the second layer may be changed oppositely depending on the feedback message from the receiving station. For example, the robustness of one of the layers may be increased and the robustness of another or the other of the layers may be decreased depending on the feedback message.

The feedback message may be received responsive to the multi-layer transmission from the transmitting station to the receiving station.

For example, the robustness of the first layer may be increased and the robustness of the second layer may be decreased depending on the feedback message from the receiving station, or vice versa. The feedback message may comprise or be indicative of the parameter $\alpha$. The robustnesses of the first and second layers may be scaled by the factors $\sin(a)$ and $\cos(a)$, respectively, for a parameter $\alpha$ in [0°, 45°] or [0°, 90°].

The feedback message may be indicative of how close the receiving station is to successfully (i.e., correctly) decoding at least one or each of the first data and the second data.

The feedback message may be indicative of one or more robustnesses to be used for retransmitting at least one or each of the first data and the second data.

The feedback message may comprise a soft acknowledgment that is indicative of a state between a positive acknowledgment and a negative acknowledgment for at least one or each of the first data and the second data.

The positive acknowledgment may be indicative of successfully (i.e., correctly) decoding the respective data. Each of the first data and the second data may be protected by a respective CRC value. Based on the CRC value, the receiving station may determine whether or not the deciding is correct.

The receiver may estimate how close it is to correctly decoding (or how far it was from failing), e.g. by estimating a metric relevant for the decoding. The data on each layer may be protected by multiple CRCs for disjoint portions of the data, so that the receiver may estimate how close it is to successfully decoding based on the fraction of positive CRCs. Alternatively or in addition, the metric may be a function of the SNR or SINR. Alternatively or in addition, using certain decoding algorithms, the receiver may determine how close it was that another decoding decision was made. By checking a parity equation, the receiver may derive the metric from soft values for the bits.

A mapping of at least one of the first data and the second data to the first layer and the second layer may depend on or may be changed responsive to the feedback message.

The method may further comprise or initiate a step of mapping the first data to one of the layers in a further transmission, if the feedback message is indicative that decoding of the first data was not successful by an amount of missing information. A portion of mutual information carried by the one layer in the further transmission may be greater than the indicated amount of missing information. More specifically, the first data may be mapped to the one layer having the least robustness or the least portion of mutual information among the layers carrying a portion of mutual information greater than the indicated amount of missing information.

The feedback message may be indicative of a positive acknowledgment for the second data and not a positive acknowledgment for the first data. The method may further comprise or initiate a step of transmitting, to the receiving station in response to the feedback message, the first data of the first HARQ process. The first data may be transmitted on the second layer simultaneously with third data transmitted on the first layer, or vice versa.

Responsive to the feedback, the first data may be transmitted (i.e., retransmitted) in a further multi-layer transmission on the second layer. The first data may be transmitted in a further multi-layer transmission on the second layer using a redundancy version (RV) other than the RV previously used in the multi-layer transmission of the first data on the first layer. The transmission of the third data on the first layer may be an initial transmission, e.g., of the first or second HARQ process.

The radio frequency may be shared, e.g., among a plurality of stations including the transmitting station and the receiving station.

The feedback message may be indicative of a positive acknowledgment for the first data and not a positive acknowledgment for the second data. The method may further comprise or initiate a step of transmitting, to the receiving station in response to the feedback message, the second data of the second HARQ process. The second data may be transmitted on the first layer simultaneously with third data transmitted on the second layer or vice versa.

The method may further comprise or initiate transmitting the first data on the second layer, if the feedback message is indicative that decoding of the first data was not successful and if the portion of mutual information carried by the second layer is sufficient (or estimated to be sufficient) for successfully decoding the first data.

The multi-layer transmission on the radio frequency may be subject to an access protocol for shared access to the radio frequency. The access protocol may comprise or perform at least one of a co-existence mechanism; a shared channel access; statistical time-division multiplexing; a distributed random access scheme for collision avoidance; a distributed collision avoidance channel access; a distributed channel access (DCA); a contention procedure; a listen before talk (LBT) procedure, e.g., according to the Third Generation Partnership Project (3GPP); and a Carrier Sense Multiple Access with Collision Avoidance (CSMA/CA), e.g., according to the standard family IEEE 802.11. Optionally, the HARQ processes may be mapped to the layers according to an access class of the respective data, e.g., according to the standard IEEE 802.11e.

A successful contention according to the access protocol may enable the transmitting station to perform the multi-layer transmission in a transmission opportunity. Optionally, each HARQ process may perform its own contention procedure. The successful contention of at least one of the HARQ processes may trigger the multi-layer transmission. The transmission opportunity may be any time period in which a station is permitted to transmit, e.g., as a result of the successful contention procedure. For example and without limitation thereto, the transmission opportunity may be a parameter TxOp defined by the standard family IEEE 802.11 or 3GPP Release 13 (or later).

The access protocol may comprise a back-off mechanism for deferring the multi-layer transmission based on a contention window. The contention window may be maintained or not increased if the feedback message from the receiving station is indicative of a positive acknowledgement for at least one of the first data and the second data.

The contention window may be increased (e.g., doubled in size) if (e.g., only if) the feedback message from the receiving station is indicative of a negative acknowledgement for both the first data and the second data. The contention window may be increased if (e.g., only if) the feedback message is indicative of a negative acknowledgement for all of the multiple layers.

The access protocol performed by the transmitting station may be based on a back-off counter. The back-off counter may also be referred to as a slot counter. The access protocol performed by the transmitting station may be initialized by randomly drawing a value for the back-off counter from the contention window, e.g., an initial contention window.

If the radio frequency is idle (i.e., unoccupied) for a predefined or configured time period (e.g., a slot or a distributed inter-frame spacing, DIFS) the back-off counter may be decremented (e.g., for each idle slot or idle DIFS). The success of the contention procedure may be defined by a vanishing (i.e., zero) back-off counter at the transmission opportunity (e.g., at the start of the transmission opportunity). The access protocol may enable the multi-layer transmission as soon as the back-off counter is zero. As long as the back-off counter is positive, the access protocol may prevent to the transmitting station from transmitting on the radio frequency.

As to a second method aspect, a method of performing a multi-layer reception from a transmitting station at a receiving station on a radio frequency is provided. The multi-layer reception comprises multiple layers having different robustnesses on the radio frequency. The method comprises or initiates a step of receiving, on a first layer of the multi-layer transmission, a first portion of first data and a first portion of second data and, simultaneously on a second layer of the multi-layer transmission, a second portion of the first data and a second portion of the second data.

Optionally, the method may comprise or initiate a step of receiving first data of a first hybrid automatic repeat request (HARQ) process on a first layer of the multi-layer transmission simultaneously with second data of a second HARQ process on a second layer of the multi-layer reception.

Herein, "receiving" the first or second data may encompass receiving a radio signal carrying the respective data. The received data may or may not be correctly decoded or decodable.

Performing the multi-layer reception may also be referred to as receiving a multi-layer transmission, e.g., the multi-layer transmission of the first method aspect.

The receiving station may perform the second method aspect. Alternatively or in addition, a system comprising the transmitting station and the receiving station may perform the method.

Each codeword for the individual layer may further incorporate a cyclic redundancy check (CRC) to verify at the receiving station whether the respective codeword is decoded successfully. Decoding may comprise, when at least one of the codewords is decoded successfully, computing soft values for the one or more other codewords using the successfully decoded codeword as additional information.

The same codeword may be received on the two most robust layers. At the receiving station, the information obtained from the two received codewords are combined when performing decoding. Alternatively or in addition, the same codeword may be received on two or more layers. At the receiving station, the information obtained from the two or more layers may be combined when performing decoding.

The second method aspect may further comprise any feature and any step disclosed in the context of the first method aspect, or a feature or step corresponding thereto, e.g., a receiver counterpart to a transmitter feature or step.

For example, the step of receiving may further comprise receiving, on the first layer of the multi-layer reception, a first portion of third data and, simultaneously on the second layer of the multi-layer reception, a second portion of the third data and, simultaneously on a third layer of the multi-layer reception, a third portion of the first data and a third portion of the second data and a third portion of the third data.

The reception of the first data may be an initial reception or a re-reception, preferably of the first HARQ process. Alternatively or in addition, the reception of the second data may be an initial reception or a retransmission, preferably of the second HARQ process. Alternatively or in addition, the reception of the third data may be an initial reception or a re-reception, preferably of the third HARQ process.

The method may further comprise or initiate a step of receiving a feedback message from the receiving station, preferably in response to the reception or a previous multi-layer transmission from the transmitting station to the receiving station on the radio frequency.

The method may further comprise or initiate, if the feedback message is indicative that decoding of the first data was not successful by an amount of missing information or if the feedback message is indicative of a non-positive or negative acknowledgment (NACK) for the first data wherein an amount of missing information for successfully decoding of the first data being estimated based the SNR or the SINR, re-receiving, from the transmitting station in response to the feedback message, a portion of the first data using at least one of the first layer, the second layer and the third layer of the multi-layer reception. Optionally, a combination of a size of the retransmitted portion and a robustness of the used layer may correspond to or may match the amount of missing information.

The multi-layer reception may comprise redundant, equivalent or equal data or portions if the SNR or the SINR is less than the first threshold value. Alternatively or in addition, the multi-layer reception may comprise the redundant, equivalent or equal data or portions if the SNR or the SINR is greater than the first threshold value and/or less than the second threshold value.

The multi-layer reception on the radio frequency may be subject to an access protocol for shared access to the radio frequency. The access protocol may comprise a back-off mechanism for deferring the multi-layer reception based on a contention window, which may be maintained or not increased if the feedback message from the receiving station is indicative of a positive acknowledgement for at least one of the first data, the second data and the third data.

In any aspect, the technique may be implemented as a multi-layer HARQ technique. The technique of performing a multi-layer transmission from a transmitting station to a receiving station on a radio frequency using HARQ on at least one layer may also be referred to as a multi-layer HARQ transmission. Analogously, the technique of performing a multi-layer reception may also be referred to as a multi-layer reception. The technique of performing a multi-layer reception from a transmitting station at a receiving station on a radio frequency using HARQ on at least one layer may also be referred to as a multi-layer HARQ reception. Receiving a retransmission may also be referred to as a re-reception. The multi-layer transmission from the transmitting station may be received by one or more receiving stations on the radio frequency. Any one of the transmitting station and the one or more receiving stations may be a radio device or a base station.

The first method aspect may be performed at or by the transmitting station (briefly: transmitter). The transmitting station may be a base station, e.g., for a downlink or a backhaul link using the radio frequency. Alternatively or in addition, the transmitting station may be a radio device, e.g., for an uplink or a sidelink using the radio frequency. The second method aspect may be performed at or by the receiving station (briefly: receiver). The receiving station may be a base station, e.g., terminating the backhaul link or the uplink. Alternatively or in addition, the receiving station may be a radio device, e.g., terminating the downlink or the sidelink.

The step of transmitting may comprise generating the modulation symbol by combining the partial modulation symbols of the respective layers, e.g., in a constellation plane or by superposing in-phase (I) and quadrature (Q) components, respectively, of all partial modulation symbols. The partial modulation symbols may be combined by determining and/or scaling an amplitude of the partial modulation symbol according to a power level of the respective layer. The different power levels may correspond to scaled modulation alphabets or scaled constellation diagrams. Alternatively or in addition, the combining may correspond to modulation alphabets or constellation diagrams shifted in the constellation plane according to the partial modulation symbol of the next higher layer.

In any aspect, the layers may be ordered according to the respective power levels. The amplitude of each pair of consecutive layers may be scaled by a factor of 2 or more. The power of each pair of consecutive layers may be different by a factor of 4 or more and/or the power level of each pair of consecutive layers may be different by 6 dB or more.

A channel used for the multi-layer transmission, e.g., the channel between the transmitting station and the receiving station, may comprise multiple subcarriers in a frequency domain. The radio frequency may correspond to one of the subcarriers or each of the subcarriers may be an example for the radio frequency. Alternatively, or in addition, the channel may comprise one or more slots or transmission time intervals (TTIs). Each slot or TTI may comprise one or a plurality of modulation symbols in a time domain. Alternatively, or in addition, the channel may comprise a directional transmission (also: beamforming transmission) at the transmitting station, a directional reception (also: beamforming reception) at the receiving station or a multiple-input multiple-output (MIMO) channel with two or more spatial streams (as a spatial domain). Each method aspect or at least the multi-layer transmission and the multi-layer reception may be performed for each of the subcarriers, the slots, TTIs or modulation symbols, and/or the spatial streams.

The transmitting station and/or the receiving station may form, or may be part of, a radio network, e.g., according to the Third Generation Partnership Project (3GPP) or according to the standard family IEEE 802.11 (Wi-Fi). The first and second method aspects may be performed by one or more embodiments of the transmitting and receiving stations, respectively, in the radio network. The radio network may be a radio access network (RAN). The RAN may comprise one or more base stations, e.g., acting as the transmitting or receiving station. Alternatively or in addition, the radio network may be a vehicular, ad hoc and/or mesh network comprising two or more radio devices, e.g., acting as the transmitting and receiving stations.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations.

The base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the first and/or second data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for performing a multi-layer transmission from a transmitting station to a receiving station on a radio frequency is provided. The multi-layer transmission comprises multiple layers having different robustnesses on the radio frequency. The device may be configured to perform any one of the steps of the first method aspect.

As to a second device aspect, a device for performing a multi-layer reception from a transmitting station at a receiving station on a radio frequency is provided. The multi-layer transmission comprises multiple layers having different robustnesses on the radio frequency. The device may be configured to perform any one of the steps of the second method aspect.

As to a further first device aspect, a device for performing a multi-layer transmission from a transmitting station to a receiving station on a radio frequency is provided. The device comprises at least one processor and a memory. Said memory comprises instructions executable by said at least one processor whereby the device is operative to perform any one of the steps of the first method aspect.

As to a further second device aspect, a device for performing a multi-layer reception from a transmitting station at a receiving station on a radio frequency is provided. The device comprises at least one processor and a memory. Said memory comprises instructions executable by said at least one processor whereby the device is operative to perform any one of the steps of the second method aspect.

As to a still further aspect a communication system including a host computer is provided. The host computer comprises a processing circuitry configured to provide user data, e.g., included in the first and/or second data of the multi-layer transmission. The host computer further comprises a communication interface configured to forward the first and/or second data to a cellular network (e.g., the RAN and/or the base station) for transmission to a UE. A processing circuitry of the cellular network is configured to execute any one of the steps of the first and/or second method aspects. The UE comprises a radio interface and processing circuitry, which is configured to execute any one of the steps of the first and/or second method aspects.

The communication system may further include the UE. Alternatively, or in addition, the cellular network may further include one or more base stations configured for radio communication with the UE and/or to provide a data link between the UE and the host computer using the first and/or second method aspects.

The processing circuitry of the host computer may be configured to execute a host application, thereby providing the first and/or second data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein:

FIG. 3 shows a flowchart for a method of performing a multi-layer transmission, which method may be implementable by the device of FIG. 1;

FIG. 4 shows a flowchart for a method of performing a multi-layer reception, which method may be implementable by the device of FIG. 2;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Wireless Local Area Network (WLAN) implementation according to the standard family IEEE 802.11, it is readily apparent that the technique described herein may also be implemented for any other radio communication technique, including a New Radio (NR) or 5G implementation, 3GPP LTE (e.g., LTE-Advanced or a related radio access technique such as Multe-Fire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
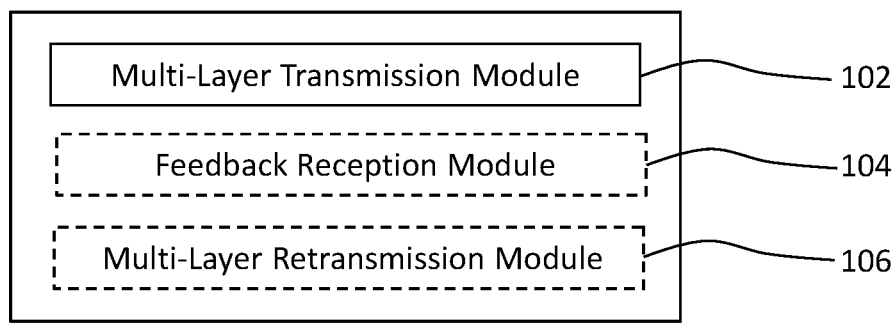
FIG. 1 shows a schematic block diagram of an embodiment of a device for performing a multi-layer transmission.

FIG. 1 schematically illustrates a block diagram of an embodiment of a device for performing a multi-layer transmission from a transmitting station to a receiving station on a radio frequency. The multi-layer transmission comprises multiple layers having different robustnesses on the radio frequency. The device is generically referred to by reference sign 100.

Optionally, the device 100 comprises a multi-layer transmission module 102 that transmits first data of a first hybrid automatic repeat request (HARQ) process on a first layer of the multi-layer transmission simultaneously with second data of a second HARQ process on a second layer of the multi-layer transmission.

Optionally, the device 100 comprises a feedback reception module 104 that receives a feedback message from the receiving station in response to the transmission from the transmitting station. The sizes of the first and second portions of the first data and/or the second data may depend on or may be changed responsive to the feedback message.

Figure 9:
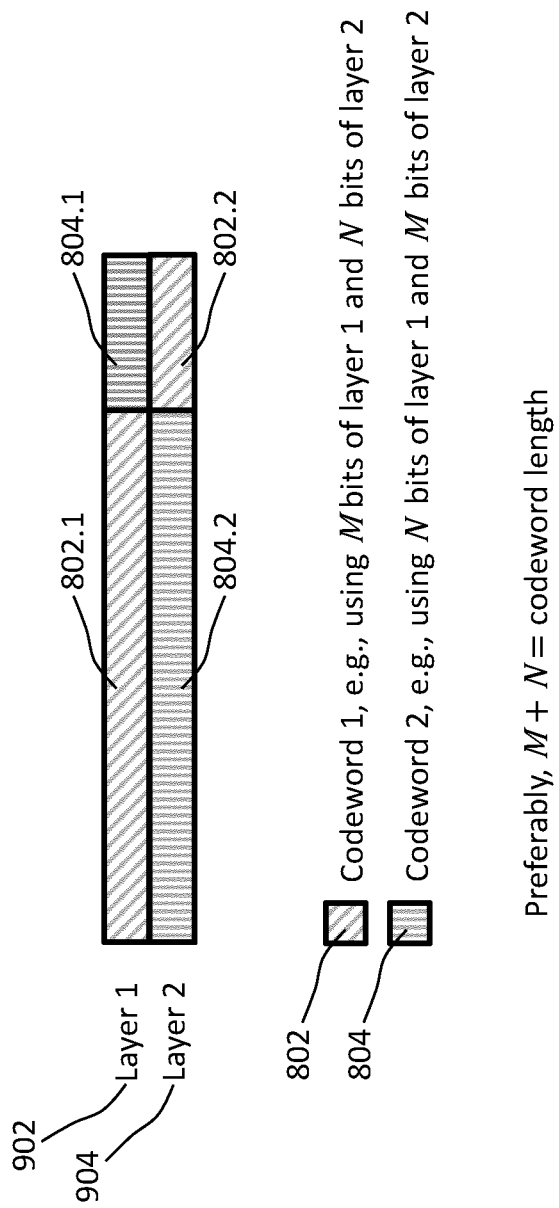
FIG. 9 schematically illustrates an embodiment that maps two codewords to two layers, wherein a portion of the first codeword is mapped to the second layer and a portion of the second codeword is mapped to the first layer.

In one embodiment, the device 100 may be implemented according to FIG. 9. Alternatively or in addition, two codewords are sent in parallel and the robustness of the different bits in the codewords are altered as illustrated in FIG. 9. Optionally, the sizes of M and N can be changed. For example, the sizes can be selected based on a feedback.

Optionally, the device 100 comprises retransmission module 106. The feedback message may be indicative that decoding of the first data was not successful by an amount of missing information or the feedback message may indicative of a non-positive or negative acknowledgment (NACK) for the first data. In the latter option, an amount of missing information for successfully decoding of the first data may be estimated based the SNR or the SINR. The module 106 retransmits, to the receiving station, in response to the feedback message, a portion of the first data using at least one of the first layer, the second layer and the third layer of the multi-layer transmission. The combination of a size of the retransmitted portion and a robustness of the used layer corresponds to or matches the amount of missing information.

In a first variant, in case the feedback message is indicative of a positive acknowledgment for the second data and not a positive acknowledgment for the first data, an optional multi-layer retransmission module 106 transmits, to the receiving station in response to the feedback message, the first data of the first HARQ process, e.g., on the second layer simultaneously with third data transmitted on the first layer or vice versa. In a second variant, which may be implemented in combination with the first variant, in case the feedback message is indicative of a positive acknowledgment for the first data and not a positive acknowledgment for the second data, the multi-layer retransmission module 106 transmits, to the receiving station in response to the feedback message, the second data of the second HARQ process, e.g., on the first layer simultaneously with third data transmitted on the second layer or vice versa.

Any of the modules of the device 100 may be implemented by units configured to provide the corresponding functionality.

The device 100 may also be referred to as, or may be embodied by, the transmitting station (or briefly: transmitter). The transmitting station 100 and the receiving station may be in direct radio communication, e.g., at least for the multi-layer transmission from the transmitting station 100 to the receiving station. The receiving station may be embodied by the device 200.

Figure 2:
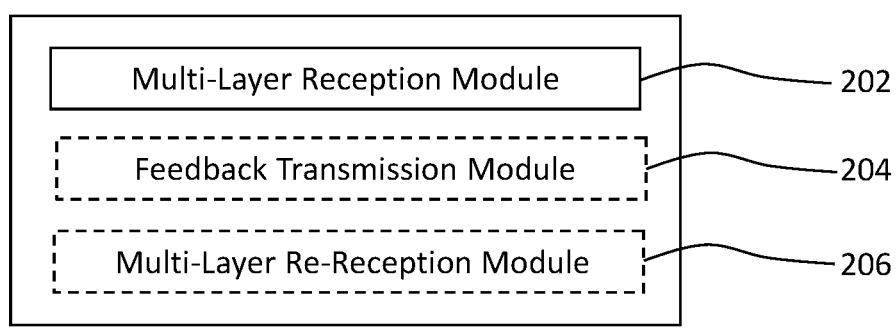
FIG. 2 shows a schematic block diagram of an embodiment of a device for performing a multi-layer reception.

FIG. 2 schematically illustrates a block diagram of an embodiment of a device for performing a multi-layer reception from a transmitting station at a receiving station on a radio frequency. The multi-layer reception comprises multiple layers having different robustnesses on the radio frequency. The device is generically referred to by reference sign 200. Performing a multi-layer reception is also referred to as receiving a multi-layer transmission.

The device 200 comprises a multi-layer reception module 202 that receives first data of a first HARQ process on a first layer of the multi-layer reception simultaneously with second data of a second HARQ process on a second layer of the multi-layer reception.

Optionally, the device 200 comprises a feedback transmission module 204 that transmits a feedback message to the transmitting station in response to the reception.

In a first variant, in case the feedback message is indicative of a positive acknowledgment for the second data and not a positive acknowledgment for the first data, an optional multi-layer re-reception module 206 receives, from the transmitting station in response to the feedback message, the first data of the first HARQ process, e.g., on the second layer simultaneously with third data transmitted on the first layer or vice versa. In a second variant, which may be implemented in combination with the first variant, in case the feedback message is indicative of a positive acknowledgment for the first data and not a positive acknowledgment for the second data, the multi-layer re-reception module 206 receives, from the transmitting station in response to the feedback message, the second data of the second HARQ process, e.g., on the first layer simultaneously with third data transmitted on the second layer or vice versa.

Any of the modules of the device 200 may be implemented by units configured to provide the corresponding functionality.

The device 200 may also be referred to as, or may be embodied by, the receiving station (or briefly: receiver). The transmitting station and the receiving station 200 may be in direct radio communication, e.g., at least for the multi-layer reception from the transmitting station to the receiving station 200. The transmitting station may be embodied by the device 100.

The technique can improve flexibility in the multi-level transmission, since by combining different layer for the first data, the robustness of the first data is not limited to the robustness of the different layers, which may be fixed. Specifically, for the example with 16-QAM, the two layers required roughly 7 dB and 11 dB, respectively. In case the first and second portions (e.g., bits) of the first data are mixed within (e.g., for a single codeword), the required SNR is instead about 9 dB. In some situations, such as when the channel is hard to predict, the multi-layer approach may give the best result whereas if the channel can be predicted, more traditional link adaptation (LA) may be preferred. Herein, traditional LA refers to the transmitter changing the modulation and coding scheme (MCS) based on the current estimate of the receiver conditions.

The technique can generalize multi-layer transmission in several ways to address some of the potential short-comings of a too large difference in terms of robustness between the different layers. In addition, a method is disclosed to obtain even more robust transmissions without changing the used modulation format.

FIG. 3 shows an example flowchart for a method 300 of performing a multi-layer transmission from a transmitting station to a receiving station on a radio frequency. The multi-layer transmission comprises multiple layers having different robustnesses on the radio frequency. In a step 302, first data of a first HARQ process is transmitted on a first layer of the multi-layer transmission. Second data of a second HARQ process is transmitted on a second layer of the multi-layer transmission simultaneously with the first data on the first layer. For example, the robustness of the first layer is greater than the robustness of the second layer.

Optionally, in a step 304, a feedback message is received from the receiving station in response to the transmission 302. The robustness of at least one or each of the first layer and the second layer may depend on or be changed responsive to the feedback message.

In an optional step 306, according to a first variant, if the feedback message is indicative of a positive acknowledgment for the second data and not a positive acknowledgment for the first data, the first data of the first HARQ process is transmitted on the second layer simultaneously with third data transmitted on the first layer, or vice versa, in response to the feedback message. That is, the first data is retransmitted, e.g., either on a layer that is different from the layer used in the initial transmission 302 of the first data or on the same layer. The selection of the layer for retransmitting the first data in the step 306 may depend on a state of the first HARQ process and/or the feedback message, e.g., the amount of missing information for correctly decoding the first data. Furthermore, the transmission of the second data in the step 302 may be a retransmission of the second data, e.g., after a previous multi-layer transmission that initially transmitted the second data.

According to a second variant of the step 306, which is implementable together with the first variant, if the feedback message is indicative of a positive acknowledgment for the first data and not a positive acknowledgment for the second data, the second data of the second HARQ process is transmitted on the first layer simultaneously with third data transmitted on the second layer, or vice versa, in response to the feedback message. That is, the second data is retransmitted, e.g., either on a layer that is different from the layer used in the initial transmission 302 of the second data or on the same layer. The selection of the layer for retransmitting the second data in the step 306 may depend on a state of the second HARQ process and/or the feedback message, e.g., the amount of missing information for correctly decoding the second data. Furthermore, the transmission of the first data in the step 302 may be a retransmission of the first data, e.g., after a previous multi-layer transmission that initially transmitted the first data.

The method 300 may be performed by the device 100. For example, the modules 102, 104 and 106 may perform the steps 302, 304 and 306, respectively.

FIG. 4 shows an example flowchart for a method 400 of performing a multi-layer reception from a transmitting station at a receiving station on a radio frequency. The multi-layer reception comprises multiple layers having different robustnesses on the radio frequency. In a step 402, first data of a first HARQ process is received on a first layer of the multi-layer reception. Second data of a second HARQ process is received on a second layer of the multi-layer reception simultaneously with the first data on the first layer. For example, the robustness of the first layer is greater than the robustness of the second layer.

Optionally, in a step 404, a feedback message is transmitted to the transmitting station in response to the reception 402. The robustness of at least one or each of the first layer and the second layer may depend on or be changed responsive to the feedback message.

In an optional step 406, according to a first variant, if the feedback message is indicative of a positive acknowledgment for the second data and not a positive acknowledgment for the first data, the first data of the first HARQ process is received on the second layer simultaneously with third data received on the first layer, or vice versa, in response to the feedback message. That is, the first data is received in a retransmission of the first data, e.g., either on a layer that is different from the layer used in the initial reception 402 of the first data or on the same layer. The selection of the layer for the re-reception of the first data in the step 406 may depend on a state of the first HARQ process and/or the feedback message, e.g., the amount of missing information for correctly decoding the first data. Furthermore, the second data received in the step 402 may be received as a retransmission of the second data, e.g., after a previous multi-layer reception.

According to a second variant of the step 406, which is implementable together with the first variant, if the feedback message is indicative of a positive acknowledgment for the first data and not a positive acknowledgment for the second data, the second data of the second HARQ process is received on the first layer simultaneously with third data transmitted on the second layer, or vice versa, in response to the feedback message. That is, the second data is received in a retransmission, e.g., either on a layer that is different from the layer used in the initial reception 402 of the second data or on the same layer. The selection of the layer for the re-reception of the second data in the step 406 may depend on a state of the second HARQ process and/or the feedback message, e.g., the amount of missing information for correctly decoding the second data. Furthermore, the first data received in the step 402 may be received as a retransmission of the first data, e.g., after a previous multi-layer reception.

The method 400 may be performed by the device 200. For example, the modules 202, 204 and 206 may perform the steps 402, 404 and 406, respectively.

In any aspect, the data of the respective HARQ process transmitted on the respective layer may be a message or a data packet.

The technique may be applied to uplink (UL), downlink (DL) or direct communications between radio devices, e.g., device-to-device (D2D) communications or sidelink (SL) communications.

Each of the transmitting station 100 and receiving station 200 may be a radio device or a base station. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrow-band) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Each of the HARQ processes may be implemented according to at least one of chase combining (CC) and incremental redundancy (IR). In CC, the non-correctly received data (e.g., a data packet) is retransmitted and by combining two or more versions of the respective data (e.g., of the data packet) in the receiver 200, an energy gain is effectively obtained leading to improved performance. In IR, additional parity bits are transmitted in subsequent transmissions leading to that in addition to an energy gain there will also be a coding gain. Typically, IR is based on that the original code (e.g., the channel code used for encoding the data to be transmitted) is of a relative low rate, e.g., ¼. Each retransmission adds more and more parity bits successively, e.g., as long as the codeword is not correctly decoded according to the feedback message.

One of the advantages of using HARQ instead of ARQ is that in case of an erroneous transmission, there is still some useful information transmitted from the transmitter 100 to the receiver 200 that can be used in the subsequent decoding (e.g., after the retransmission). Since a decoding error (e.g., of the first data) in this way is less harmful, embodiments of the technique allow for a more opportunistic use of the channel, i.e., the radio frequency. That is, the data (e.g., data packets) can be transmitted at a higher data rate on average.

In an embodiment of the transmitting station 100, the respective data is stored, e.g., as codewords, in a plurality of HARQ queues, which are mapped to the respective layers. In an embodiment of the receiving station 200, the respective data is stored, e.g., as soft bits, in a plurality of HARQ queues, which are fed from the respective layers.

Herein, whenever referring to noise or a signal-to-noise ratio (SNR), a corresponding step, feature or effect is also disclosed for noise and/or interference or a signal-to-interference-and-noise ratio (SINR).

In any embodiment, the radio frequency is optionally shared or unlicensed. While an access protocol (i.e., a co-existence mechanism) for shared access to the radio frequency (i.e., shared channel access) can reduce an amount of collisions, there are many situations, in which the conventional co-existence mechanism does not work very well. Specifically, since a listen-before-talk (LBT) operation is performed by the device intended to initiate a transmission, i.e., the transmitter 100, the knowledge of the interference conditions at the device intended for the reception, i.e., the receiver 200, may largely be unknown.

Figure 5:
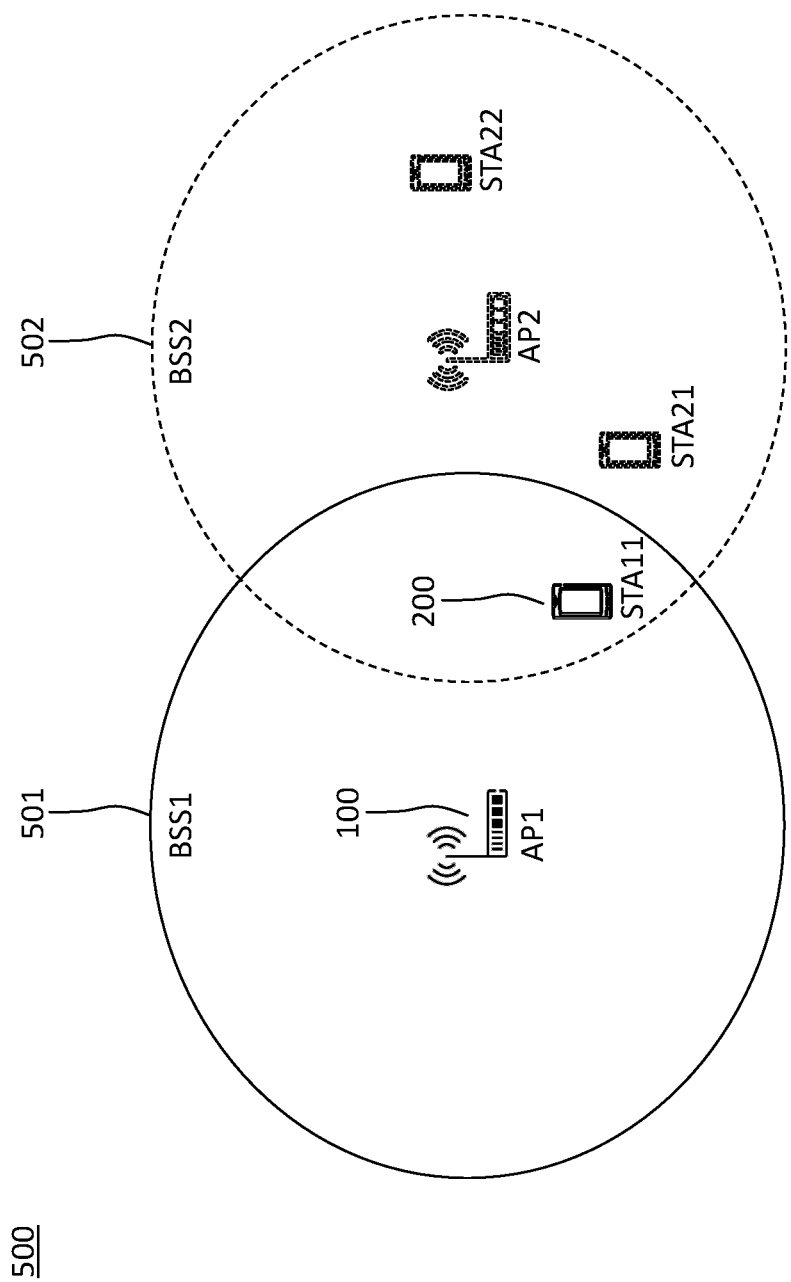
FIG. 5 schematically illustrates an exemplary network environment for implementing the devices of FIGS. 1 and 2.

FIG. 5 schematically illustrates how the receiver 200 may experience interference conditions that are very different from interference conditions at the transmitter 100. More specifically, an example network environment 500 for unknown receiver conditions is illustrated in FIG. 5.

An Access Point 1 (AP1) embodies the transmitter 100. The AP1 may serve a Basic Service Set 1 (BSS1) within the range indicated at reference sign 501. The AP1 is, in the exemplary situation, not within a coverage area 502 of any of the stations belonging to a Basic Service Set 2 (BSS2), so if AP1 has data to send to Station 11 (STA11) embodying the receiver 200, it will initiate a transmission.

However, the receiver conditions at STA11 will severely depend on if or what transmissions are ongoing in the BSS2. If the STA22 is transmitting, this may not impact a transmission to STA11 at all, whereas if the STA21 is transmitting a transmission to STA11, it may most likely not be correctly received. If the AP2 is transmitting, the outcome may in fact depend on to which station the AP2 is transmitting. For example, if the AP2 uses a directional transmission towards the STA22, little interference may be experienced at the STA11.

At an embodiment of the transmitter 100, the typical procedure when transmitting information in the steps 302 and 306 is that the information is encoded by an error correcting encoder, and then the coded bits (e.g., the codeword) are modulated using a suitable modulation format. The error correcting code may for instance be a binary convolution code (BCC) or a low density parity check (LDPC) code. Alternatively or in combination, the modulation may for instance be phase shift keying (PSK) or M-ary quadrature amplitude modulation (M-QAM).

The receiver 200 then tries to decode the information (i.e., the respective data received on the respective layer) by essentially doing the reversed operations. First the received signal is demodulated, i.e., soft information for the bits (briefly: soft bits) are extracted from the received modulation symbol (e.g., out of M-ary symbols defining a modulation alphabet of size M). The soft information is then fed to the decoder for decoding the information (i.e., the respective data).

Figure 6:
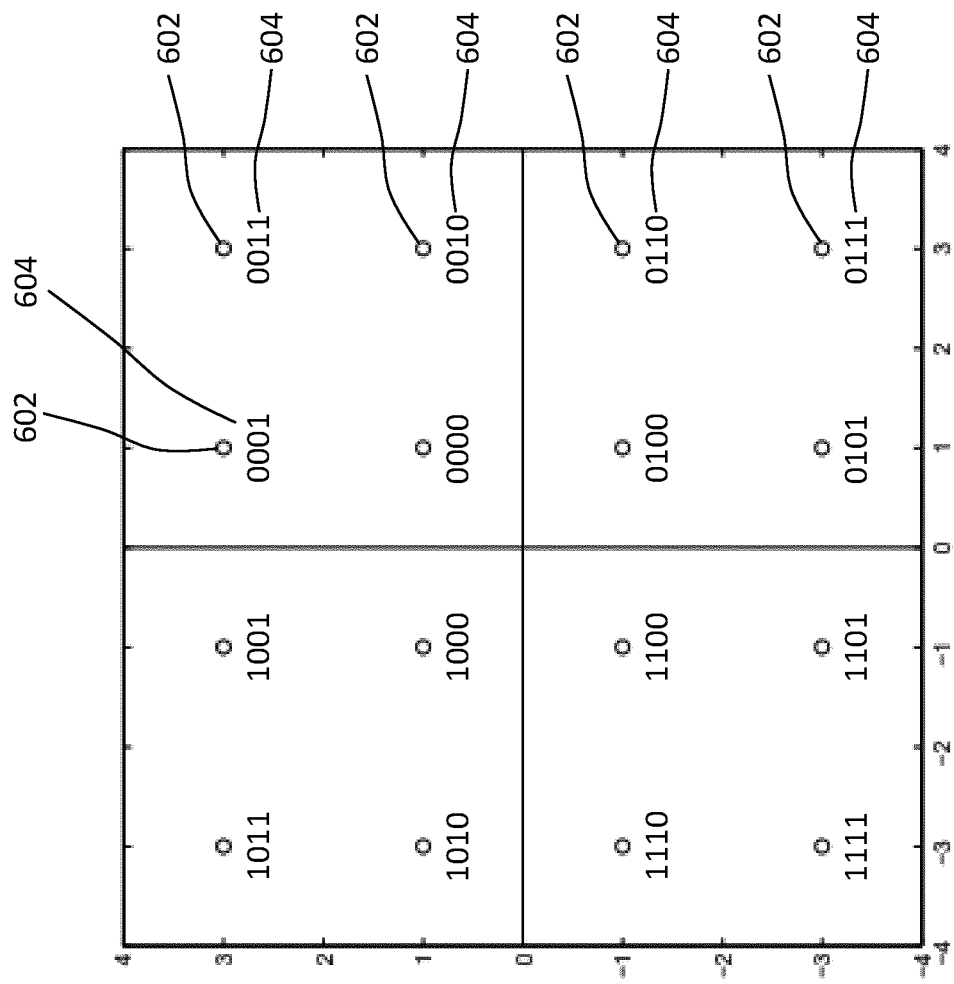
FIG. 6 schematically illustrates an exemplary constellation diagram for a multi-layer transmission.

When non-binary modulation is used, $\log_2(M)$ bits are mapped on each M-ary modulation symbol. This mapping can in principle be done in many ways, but typically so-called Gray mapping is used. In Gray mapping, the bit-pattern for two adjacent constellation points only differ in one position FIG. 6 schematically illustrates a constellation diagram 600 of a Gray mapping for 16-QAM. Even if a modulation symbol 602 is in error, not all of the different bits 604 represented by the respective modulation symbol 602 are in error. Examining the mapping a bit closer, it can be observed that the first bit determines whether the 16-QAM symbol 602 is to the right or to the left of the imaginary axis (i.e., the quadrature-phase axis of the constellation diagram 600). The second bit determines whether the 16-QAM symbol 602 is above or below the real axis (i.e., the in-phase axis of the constellation diagram 600). The third bit determines whether the 16-QAM symbol 602 is in the inner two columns, i.e., the two columns closest to the imaginary axis, and the fourth bit determines whether the 16-QAM symbol 602 is in the inner two rows, i.e., the two rows closest to the real axis.

Using information theoretical arguments, it can be shown that bits 1 and 2 carry more information (e.g., a greater portion of the mutual information between the transmitter 100 and the receiver 200) than bits 3 and 4. The total information (e.g., the mutual information) transmitted in a corresponding implementation of the step 302 and 306 is the sum of the information transmitted by the four bits.

Figure 7:
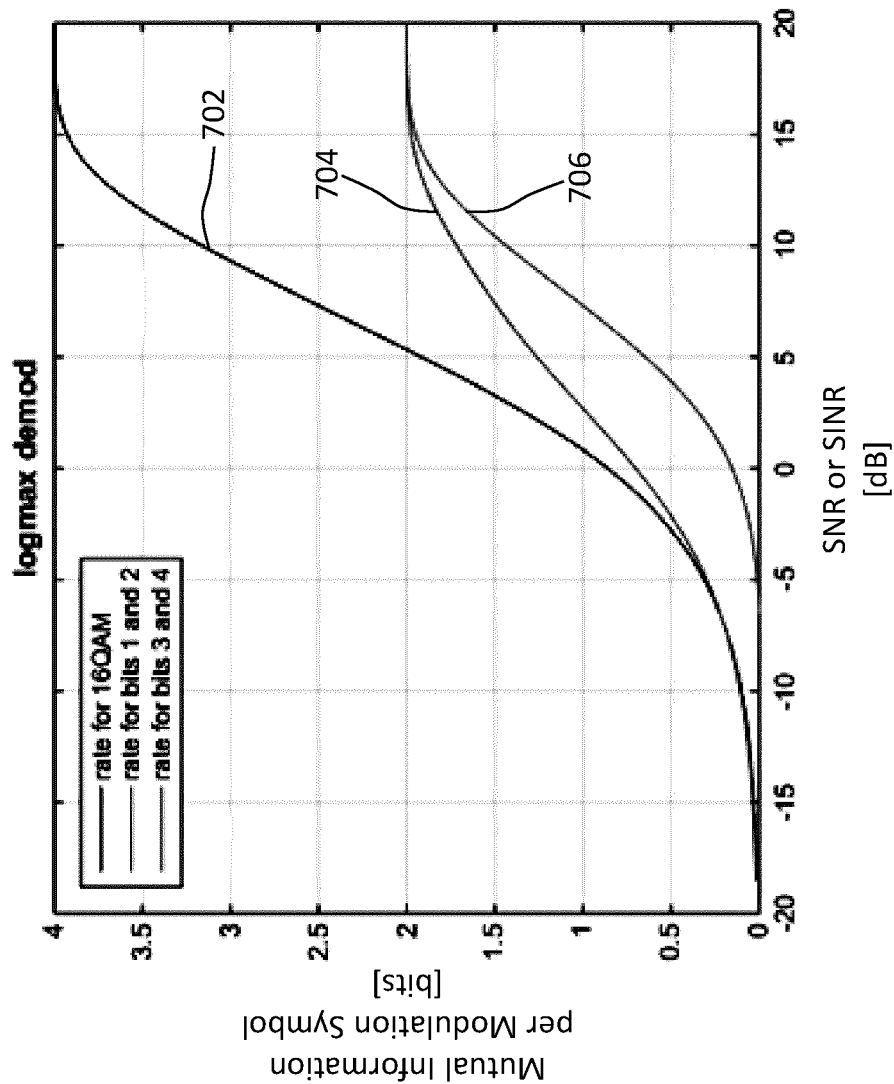
FIG. 7 shows a diagram schematically illustrating exemplary robustnesses or portions of mutual information of first and second layers of a multi-layer transmission.

In FIG. 7, the information rates 704 and 706 (e.g., the portions of the mutual information per modulation symbol) for the different bits as well as the total information rate 702 (e.g., the mutual information per modulation symbol) are schematically illustrated in a diagram 700 in FIG. 7. The information rates are shown on the vertical axis as a function of the SNR or SINR on the horizontal axis. More specifically, the information rates 704 and 706 correspond to the groups of bits (1, 2) and (3, 4), respectively.

In order to extract the information in the receiver 200, the receiver 200 must process the received signal properly. In the example illustrated in FIG. 7, the information is obtained using a decoder that maximizes the logarithm, which is also referred to as log-max approach. For example, the decoder maximizes the logarithm of the likelihood ratio, which is also referred to as maximum likelihood decoding.

FIG. 7 illustrates how the information rates 704 and 706 for the different bits vary with the SNR or the SINR (in units of decibel, dB) of the received signal. The information rate 704 applies for the bits 1 and 2 as a first bit group representing the first data transmitted on the first layer. The information rate 706 applies for the bits 3 and 4 as a second bit group representing the second data transmitted on the second layer.

In a conventional codeword, the different bits will be mapped on modulation symbols and thus typically ¼ of the codeword bits will be mapped as bit 1, bit 2, bit 3, and bit 4, respectively. Assuming the decoding and deinterleaving works as intended, the performance of the error correcting code will effectively be determined by the total information that can be extracted from the bits in the codeword, i.e., the fact that different bits are of different importance (i.e., have different robustness or represent different portions of the mutual information) is of no concern.

The technique can exploit that different bits in a received modulation symbol carry different (and, optionally, SNR-varying) amounts of information (e.g., portions of the mutual information). To provide a motivation for this, again consider FIG. 7 and suppose that a code of rate ¾ is used. In case the coded bits are mapped to bits 1 to 4, as described above, it can be seen that a SNR of at least 9 dB is required to obtain sufficient information (e.g., 3 bits out of 4 corresponds to the ¾ code rate). However, if instead the bits in the codeword would only be mapped on bit 1 and bit 2, which carries relatively more information than bit 3 and bit 4, it can be seen that a SNR of around 7 dB would suffice (e.g., 1.5 bits out of 2 corresponds to the ¾ code rate). Alternatively, if the codeword bits would be transmitted as bit 3 and bit 4 a SNR of 11 dB would be required.

Consider by way of example a situation in which the SNR is changing (e.g., sometimes) from one packet to the next so that it sometimes is 7 dB and sometimes is 11 dB, i.e., with the average being 9 dB, and also suppose that a code with a code rate of ¾ is used. Just considering the amount of information available at the receiver 200, it can be concluded that when the SNR is 7 dB, the decoding will fail, whereas when the SNR is 11 dB, there is a high probability that the decoding will be successful. For the moment one may ignore what error correcting code is actually being used to achieve this, but merely observe what is possible.

In case of a conventional ARQ scheme, a packet that is received at 7 dB SNR will simply have to be retransmitted, and then it is retransmitted until it eventually is transmitted when the channel (i.e., the channel defined by the radio frequency between the transmitter 100 and the receiver 200) happens to be in the state in which the SNR is 11 dB.

If HARQ is used instead, the decoder at the receiver 200 extracts some information also when the decoding fails. Referring to FIG. 7, the receiver can ideally extract about 2.5 bits of information per modulation symbol. Thus, since the packet was transmitted in the step 302 with a rate ¾ and 16-QAM, which implies 3 bits of information per modulation symbol, the decoder at the receiver 200 is effectively lacking 0.5 bits per modulation symbol. The packet is retransmitted according to the step 306. For example, chase combining is used so that the very same packet is transmitted again. For the retransmitted packet, the SNR may now be either 7 dB or 11 dB.

If a packet is received in the step 402 when the SNR of the channel is 7 dB, upon reception 406 of the retransmitted packet, the receiver 200 combines the information from the retransmitted packet with the information extracted from the first packet in the step 402, and effectively has information corresponding to what can be obtained from a packet received at 10 dB, since combining two packet at the same SNR will be the same as receiving one packet at twice the SNR assuming the noise to be uncorrelated.

Referring to FIG. 7, the information per symbol use at 10 dB exceeds 3, and thus the decoding can be expected to be successful. Although this is the desired outcome, it can be noted that the channel during the retransmission 306 of the packet in fact allowed for 2.5 bits of information per channel use to be extracted, so, since only 0.5 bits per channel use was lacking one would have in a sense wasted 2 bits of information in this exemplary embodiment.

If instead a packet is received in the step 402 or 406 when the SNR of the channel is 11 dB, about 3.5 bits of information per channel use (i.e., per modulation symbol) can be extracted at the receiver 200. By the same reasoning, since the transmitter knows that only 3 bits of information per channel use are needed, transmitting only 3 bits of information is somewhat wasteful. For example, when it is a retransmission 306 of a packet (e.g., the second data) and only 0.5 bits of information per channel use is needed, retransmitting exclusively the packet (i.e., the second data) would effectively waste 3 bits per channel use. The technique may be implemented to transmit another codeword (e.g., the third data) superimposed, since 3 bits per channel use is exactly what is needed for potentially being able to decode the other codeword correctly.

As a simple numerical comparative example useful for illustrating an exemplary advantage achievable by implementing the technique, suppose the channel (i.e., the SNR of the channel) is toggling between 7 dB and 11 dB so that conventionally (i.e., without a multi-layer transmission) two consecutive transmissions are received at a SNR of 7 dB followed by one transmission at a SNR of 11 dB. Thus, 3 transmissions are conventionally needed for 2 packets. The first two transmissions comprise only the first packet and are combined so that the first packet is correctly received. The third transmission will directly result in a correctly received second packet. Stated in another way, the average transmission rate is 2 bits per modulation symbol.

Figure 8A:
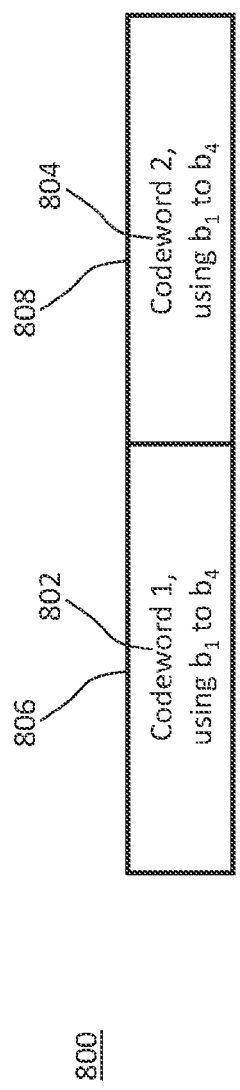
FIG. 8A schematically illustrates a comparative example that maps one codeword to one modulation symbol.

FIG. 8A schematically illustrates the comparative example of mapping 800 two bit strings 802 and 804 (e.g., codewords 1 and 2) to two modulation symbols 806 and 808, respectively.

Figure 8B:
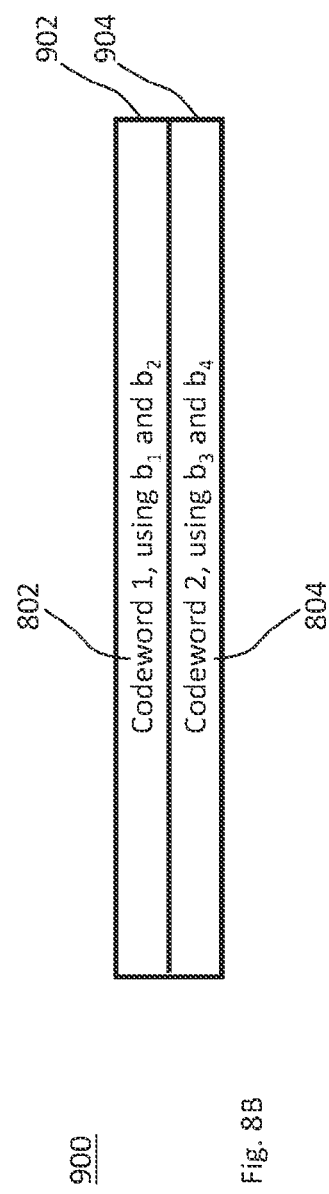
FIG. 8B schematically illustrates an embodiment that maps two codewords to two layers.

In contrast, FIG. 8B schematically illustrates an exemplary embodiment that maps 900 the bit strings 802 and 804 representing the first and second data to the first and second layers 902 and 904, respectively. In the embodiment illustrated in FIG. 8B, the transmission 302 of each of the bit strings 802 and 804 may extend in time over the two modulation symbols 806 and 808.

The different groups of bits, e.g., the first bit group ($b_1$, $b_2$) and the second bit group ($b_3$, $b_4$), carry different amounts of information (e.g., different portions of the mutual information). Specifically, data may be encoded using a code rate of ¾. The resulting codewords are not mapped one-to-one to a modulation symbol, e.g., a 16-QAM symbol. Rather, for each of the multiple layers 902 and 904, a codeword is generated (e.g., per modulation symbol). For example, two codewords are generated for the first layer 902 and the second layer 904, respectively. The first codeword 802 is mapped on bits $b_1$ and $b_2$ and the second codeword 804 is mapped on bits $b_3$ and $b_4$. Consequently, two codewords are transmitted in parallel in the step 302 and/or 306. The duration of a codeword will be twice as long compared to the comparative example, so that the data rate for the initial transmission 302 is identical in both exemplary cases illustrated in FIGS. 8A and 8B, respectively.

An implementation of the technique may use that different layers 902 and 904 of the multi-layer transmission have different robustnesses, e.g., that different bits in a modulation symbol carry different amounts of information (e.g., different portions of the mutual information). In other words, the different bits within a modulation symbol (i.e., the different bits in a bit string represented by the modulation symbol) are not equally reliable or robust, so that bits 1 and 2 associated with the first layer are more reliable or robust than bits 3 and 4 in the examples of FIGS. 6 to 8B.

The following embodiment uses the same assumptions as before, i.e., the SNR is either 7 dB or 11 dB. Referring to FIG. 7, in case of a SNR of 11 dB, the second data 804 (i.e., the Codeword 2) is also successfully decoded at the receiver 200. According to FIG. 7, this is in practice possible with a very small margin. In case the SNR is 7 dB, only the first data 802 (i.e., the Codeword 1) is successfully decoded at the receiver 200. However, the receiver 200 is still able to extract about 1 bit of information per channel use (i.e., per modulation symbol) for the second data 804 (i.e., the Codeword 2).

In the next transmission 306, one new codeword is generated representing the third data, since the Codeword 1 for the first data 802 was correctly received according to the feedback message in the second variant. The second data 804 (e.g., the Codeword 2 in the case of chase combining) is retransmitted according to the second variant of the steps 306 and 406. The retransmitted second data 804 (e.g., the Codeword 2 in the case of chase combining) may be mapped on the first layer 902 (i.e., on the bit 1 and bit 2 in the exemplary embodiment using 16-QAM).

Alternatively, the second data 804 may be mapped again on the second layer 904 (e.g., on bit 3 and bit 4 in the exemplary embodiment using 16-QAM).

While a multi-layer transmission without HARQ may map a retransmitted packet to the more robust or the most robust layer (e.g., the more or most reliable bits) to ensure that a delay caused by the retransmission is minimized, the technique may be implemented using HARQ to improve spectrum efficiency, e.g., by selecting the layer (e.g., the corresponding bit group) for the retransmission in the step 306, which gives enough additional information to correctly decode the respective data at the receiver 200, but not more additional information than is needed for the correctly decoding or not additional information in an excessive way.

In the example of the SNR being 7 dB, the receiver 200 is able to extract 1 bit of information per channel use (e.g., per modulation symbol) on the second layer 904 (i.e., for Codeword 2 in the step 402). Consequently, when retransmitting the second data (e.g., the Codeword 2 in the case of chase combining), only another 0.5 bits per channel use are needed for correct decoding of the second data 804. Since this is achievable also if the second data 804 (e.g., the Codeword 2) is retransmitted on the second layer 904 (e.g., the bits 3 and 4 of the second bit group), the second data 804 is retransmitted in the step 306 using again the second layer 904.

Hence, for the same numerical conditions of the channel toggling between 7 dB and 11 dB so that two consecutive transmission are received at 7 dB followed by one transmission at 11 dB SNR, the exemplary embodiment achieves the following performance. In a first transmission according to the step 302 at SNR=7 dB, the first data 802 (e.g., the Codeword 1) on the first layer 902 is successfully received and decoding of the second data 804 (e.g., the Codeword 2) received on the second layer 904 fails. In a second transmission according to the step 306 at SNR=7 dB, third data (i.e., new data, e.g., a new Codeword 1) is successfully transmitted on the first layer 902, and the second data 804 (e.g., the Codeword 2 in the case of chase combining) is successful transmitted (i.e., retransmitted) on the second layer 904. In an optional third transmission, which may be a further instance of the step 302 or 306, at SNR=11 dB, fourth data (e.g., a new Codeword 1) and fifth data (e.g., a new Codeword 2) are successful transmitted on the first layer 902 and the second layer 904, respectively.

In total 5 pieces of data (e.g., 5 codewords) are successfully received during these 3 transmissions, compared to 4 codewords according to prior art (e.g., according to the comparative example). This corresponds to a gain of 25%. It is noted that if the retransmission of the Codeword 2 in the step 306 instead would have used the first layer 902 (e.g., the bits 1 and 2), the new codeword (on the second layer 904) would have failed, since it would have been transmitted using bits 3 and 4, and there would be no gain compared to the prior art. Although a very simple example, the exemplary embodiment illustrates the advantage of using the channel capacity more efficiently, i.e., the effect of a gain in spectral efficiency by not wasting more bits than necessary for the retransmission of data.

Having outlined a basic concept or origin for achieving the potential gain as well as the features to obtain the gain, further embodiments of the technique are described below in some more detail. Each of these embodiments may be compatible with or comprise any one of the features described above, particularly with reference to any one of the FIGS. 1 to 8B.

In any embodiment, the multiple layers may be implemented by codewords transmitted in parallel (e.g., simultaneously or in the same modulation symbol). Analogously, the number of codewords transmitted in parallel may be referred to as the number of the multiple layers in the multi-layer transmission. The transmission of the multiple layers in parallel may be distinct from a transmission of several streams, e.g., as done for a multiple-input multiple-output (MIMO) channel between transmitter and receiver. For example, the concept of multiple layers (i.e., the multi-layer transmission) is applicable also when a single antenna is used at the transmitter 100 and/or the receiver 200. Furthermore, in case of a MIMO channel between the transmitter 100 and the receiver 200, the concept of multiple layers is applicable per MIMO stream (i.e., spatial stream) of the MIMO channel.

Any embodiment may use a multi-layer HARQ transmission. Alternatively or in addition, in any embodiment the data (e.g., the first data 802, the second data 804 or the third data 806) to be transmitted, i.e., information, may be encoded and/or may be transmitted from one transmitter 100 to one receiver 200. The FEC encoding may be based on a convolutional code, an algebraic block code, a low density parity check (LDPC) code, or some other error correcting code. The encoded bits are formed into codewords, and the bits in the different codewords are mapped to non-binary modulation symbols in a way that different bits represented by these non-binary symbols have different robustness (e.g., reliability or portions of the mutual information) and, thus, when received by the receiver 200 typically carry a varying amount of information.

Furthermore, each non-binary symbol carries information from at least two different codewords, i.e., at least the first data on the first layer and the second data on the second layer.

An example modulation may have a size $M=2^m$, wherein m is an integer greater than 1, e.g., in the range $2 \leq m \leq 10$. The number of multiple layers is equal to or less than m, e.g., 2 or 3.

The encoders used for the different layers may or may not be identical. In one implementation, different codes may be used such that, e.g., layer 1 is using a convolutional code, while layers 2 and 3 are using LDPC codes. In another implementation, the multiple layers may use the same type of code, e.g. LDPC. Furthermore, in any of the implementations, the code rates used for the different layers may be different.

The technique may be implemented as method of assigning or selecting an MCS (which is also referred to as a rate assignment), e.g., depending on a target value for a bit error ratio and/or a codeword error ratio. Given an average expected SNR and the associated uncertainty range, the transmitter 100 determines a multitude of SNR targets for each of the multiple layers (e.g., for each of the first and second layers). The uncertainty range may be defined by the standard deviation of SNR, e.g., relative to the expected average SNR. The uncertainty range may be an accuracy requirement or an agreement specified or agreed between the transmitter 100 and the receiver 200 (e.g., a SNR feedback agent at the receiver 200). The uncertainty range may be further determined from previous feedback messages (e.g., expressly or implicitly) indicative the SNR. The previous SNRs may be stored in logs, records or histograms.

Further advantages and implementations of encoding multiple codewords for the multiple layers, respectively, are described. Each codeword for the individual layer may further incorporate a cyclic redundancy check (CRC) to verify at the receiver 200 whether the respective codeword is decoded successfully. When at least one of the codewords is decoded successfully, the soft values for the one or more other codewords may be computed using this additional information such that an enhanced reliability is achieved.

A first embodiment uses the portions of the first data 802 (and/or portions of the further data 804 and/or 806) for mixing of layers, e.g., for a first or initial transmission 302. This mixing may also be referred to as partial layer selection, distributing of transmit data or mapping by mixing layers.

FIG. 9 schematically illustrates how the coded bits (i.e., the first data 802 and the second data 804) are mapped to the 16-QAM symbols by mixing the layers 902 and 904.

According to the first embodiment a codeword is transmitted using bits from more than one layer, namely the layers 902 and 904. How many bits are transmitted in the step 302 using the respective layer 902 and 904 may be based on the expected or reported SNR at the receiver and the performance for respective layer 902 or 904. For example, more than one codeword is sent in parallel (e.g., simultaneously). Preferably, not all bits of all layers are used for one codeword.

FIG. 9 shows the basic idea of mapping two codewords on 16-QAM symbols by mixing the layers 902 and 904. As it is shown in FIG. 9, the majority of the first codeword bits (M bits as an example for the first portion 802.1 of the first data 802) are mapped on bits $b_1$ and $b_2$ (i.e., the first layer 902). The rest of the bits (N bits as an example for the second portion 802.2 of the first data 802) are mapped on bits $b_3$ and $b_4$ (i.e., the second layer 904). Similarly, the second codeword bits (i.e., the second data 804) are spilt into M and N bits (corresponding to the second and first portions 804.2 and 804.1, respectively, then mapped on second and first layer, respectively.

The parameters M and N may be selected based on the expected and/or reported SNR at the receiver side, modulation and coding scheme.

Figure 10:
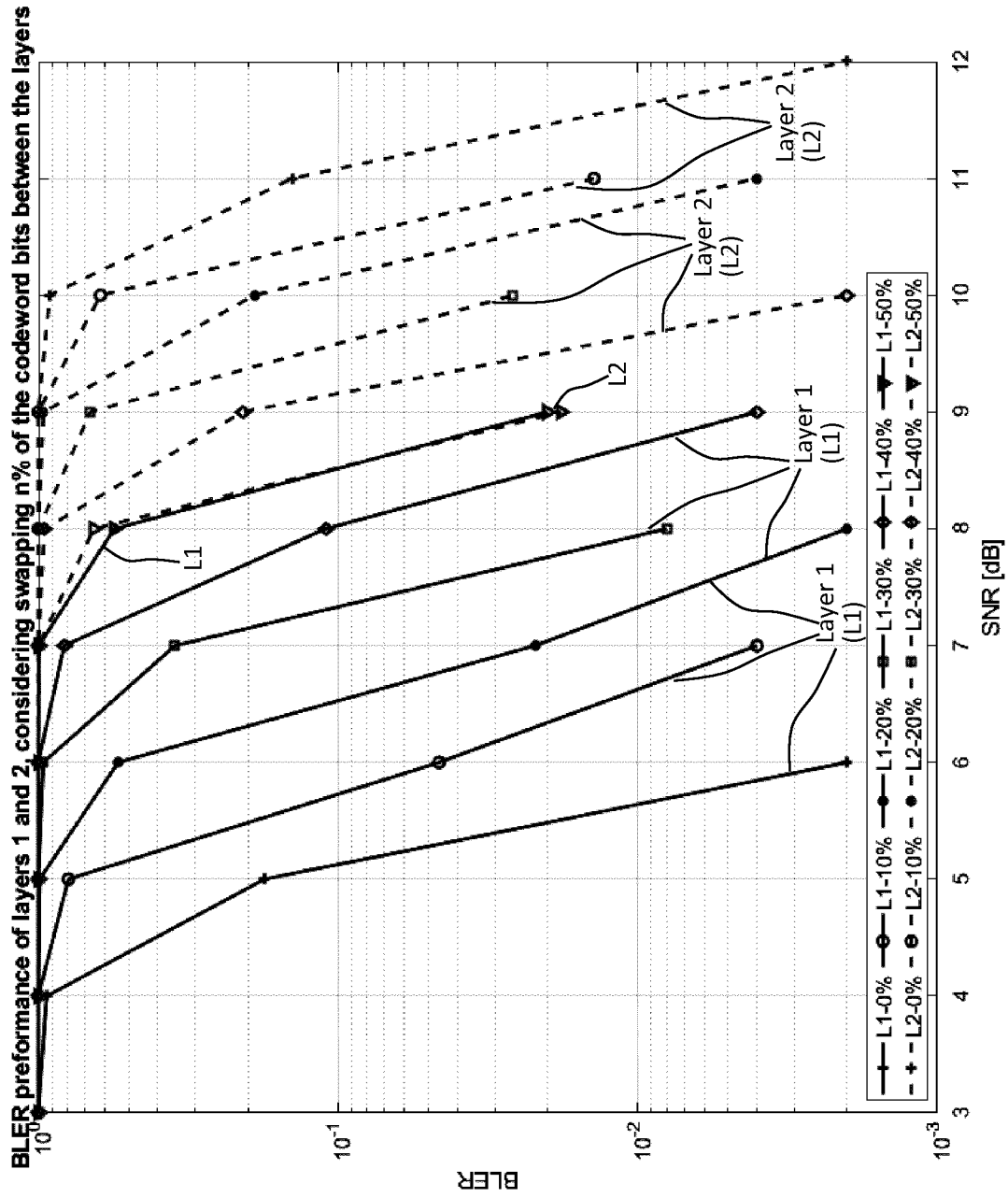
FIG. 10 shows a diagram schematically illustrating exemplary error rates or codeword error probabilities achievable by different sizes of the portions.

FIG. 10 shows exemplary graphs of a block error rate (BLER) performance of the first layers 902 (or L1) and the second layer 904 (or L2). For example, the coded bits 802 and 804 are mapped to the 16-QAM symbols by mixing the layers 902 and 904, e.g., as described above.

As an example, the transmission 302 of codewords of an LDPC code by using 256-QAM and multilayer mapping is considered. Possible values of M and N, e.g., as a function of the received SNR at the receiver side 200, are determined. Using 256-QAM and multilayer mapping, in total 8 layers can be transmitted in parallel. For a typical Gray mapping, the robustness of the 8 layers are such that there are 4 different robustness levels, each with 2 layers. For brevity, the layers having different layers are considered herein as "layers" (e.g., by combining layers having the same robustness).

FIG. 10 shows the BLER performance for transmitting the codewords in the first and second most robust layers 902 and 904, by swapping n % of the codeword bits between the layers 902 and 904.

As it can be seen from FIG. 10, considering transmitting the whole codeword bits (i.e., the first data 802) in the first layer 902, to decode the codeword, the received SNR needs to be larger than 6 dB (as an example of the first threshold value). For transmitting in the second layer 904, the SNR needs to be larger 12 dB (as an example of the second threshold value).

FIG. 10 illustrates results (labelled Layer 1 or L1) for first portions having a size m %, m=M/(M+N) relative to the total size (M+N) of the first data 802. The results for a mapping of m %, m=90, 80, 70, 60, 50 of the codeword bits 802 on the first layer 902, and the rest of the bits (n % of the bits, n=N/(M+N)) on the second layer 904, are illustrated. In FIG. 10, the case m %=90% is labeled "L1-10%", m %=80% is labeled "L1-20%", etc.

The results (labeled Layer 1 or L1 on the left-hand side) show that for every 10% of codeword bits 802 that are mapped on the second layer 904 instead of the first layer 902, the robustness of the transmission decreases by ~1 dB.

Analogously to the first layer 902, the mapping of m % of the codeword bits (i.e., the second data 804) on the second layer 904, and the rest of the bits on the first layer 902, is illustrated by the individual graphs (labeled Layer 2 or L2 on the right-hand side) in FIG. 10. As it is shown in the FIG. 10, for every 10% of codeword bits that are mapped on the first layer instead of the second layer, the robustness of the transmission increases by ~0.6 dB. In FIG. 10, the case m %=90% is labeled "L2-10%", m %=80% is labeled "L2-20%", etc.

Now suppose that the expected SNR at the receiver side is 7 dB. This SNR is larger than needed for the robustness provided by the first layer. According to FIG. 10, even by transmitting 90% of the codeword bits in the first layer and rest (n %=10%) of the bits in the second layer, the transmitted codewords can be decoded successfully. For the case that the expected SNR at the receiver side is 8 dB, n %=20% of the codeword bits can be mapped on the second layer.

To make this example more general, based on the results presented in FIG. 10, for the expected SNR at the receiver side (denoted by $SNR_{[dB]}$), larger than the robustness of the first layer but less than that of the second layer, it is suggested to perform multi-layer mapping wherein n % of the bits are swapped between the first and second layer, where n can be obtained by, $$n = \left\lfloor \frac{(SNR_{[dB]} - 6)}{10} \right\rfloor 100.$$

In a variant, the bracket (which denotes the floor function) may be replaced by a ceiling function or may be omitted, i.e., without discretization (at least at this point of the computation).

Figure 11A:
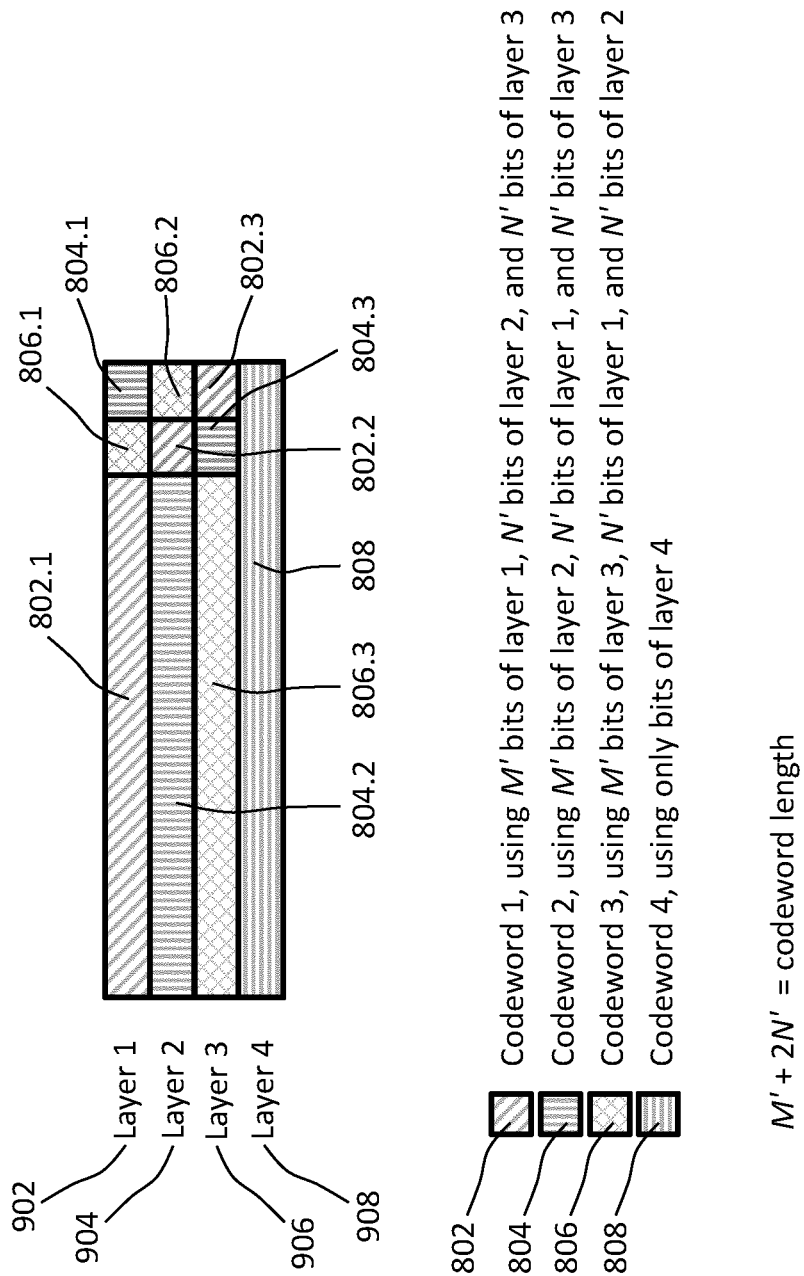
FIG. 11A schematically illustrates an embodiment that maps four codewords to four layers, wherein portions of the first codeword are mapped to the second and third layers and a portion of the second codeword is mapped to the first and third layers.

FIG. 11A. Illustration is an illustration of how the coded bits are mapped to the 256-QAM symbols by mixing the layers.

As the SNR increases, the transmitter 100 may start mixing of more layers. For the case in which $SNR_{[dB]}$ is larger than the robustness of the second layer but less than that of the third layer, the mixing of the layers can be done as illustrated in FIG. 11A. As it is shown in FIG. 11A, m'% of the first codeword bits (M' bits) are mapped on the first layer, n'% bits (N' bits) on the second layer and n'% bits on the third layer. Likewise, the bits of the second and third codewords are split and mapped on the first three layers but the fourth codeword bits are only mapped on the fourth layer. The parameter n' can be obtained as, $$n' = \left\lfloor \frac{(SNR_{[dB]} - 12)}{10} \right\rfloor 100.$$

In a variant, the bracket (which denotes the floor function) may be replaced by a ceiling function or may be omitted, i.e., without discretization (at least at this point of the computation).

Finally, for $SNR_{[dB]}$ larger than the robustness of the third layer, one can consider mixing of all four layers. A very similar method, as the one described in the above-mentioned example, can be used to compute the parameters M and N for other modulation and coding schemes.

In the above example where three layers are mixed, the same number of bits from codeword 1 was transmitted on layer 2 and layer 3, and analogously for the other codewords. It is of course also possible to combine different number of bits from all the three layers.

A second embodiment uses the portions for mixing of layers for a retransmission 306.

When a codeword is received in error such that a retransmission is needed, there is potentially a need for increased granularity when it comes to how much additional information should be transmitted in a subsequent packet. Although there are similarities between this embodiment and Embodiment 1, there is also one important difference. In a first transmission, the number of bits in the codeword must not be too small in order to allow for correct decoding even if the SNR is infinite. Specifically, if e.g. a rate ½ code is used at least half of the code bits must be transmitted. However, in case of a retransmission it may suffice to only transmit a single bit of a code word if the receiver is very close to correctly decode the codeword.

In case of retransmission the possibility to only transmit part of a codeword using a suitable layer is also disclosed. In situation when it is estimated that the receiver was close to correctly decode a codeword, the retransmission may either be based on transmitting a relatively small number of bits using a robust layer or by transmitting a relatively large number of bits using a less robust layer.

If for instance a low-density parity check (LDPC) code is used it may be expected that it is more attractive to transmit few bits with high reliability because of the structure of the code. However, if a convolutional code is used without interleaving the connection between different coded bits is limited to bits that are not too distant in the codeword. In this case it may therefore be preferred to send the additional information spread out over more code bits.

A third embodiment uses an estimation of the additional information needed for correct decoding.

As indicated in the previous embodiment, it is desirable to have the ability to (re-)transmit a codeword that contain just enough information to allow for correct decoding not to waste channel resources. For the transmitter to know how much additional information is needed, the receiver must determine this and send this information back. That is to say, the receiver must when not being able to decode a codeword assess how close it actually was and send this information back to the transmitter together with the NACK.

In one alternative, the receiver by sending a NACK, can ask the sender to retransmit a number of codeword bits (N bits) by mapping them on the layers with higher robustness. For example, if the codeword has been transmitted in the second layer and the transmitter received the corresponding NACK, the transmitter can limit itself to retransmit only N bits of the codeword by mapping them on the first layer. The parameter N can be computed based on how close the received SNR is to the robustness of the layer on that the codeword bits have been mapped.

As an example, consider 256-QAM, multilayer mapping, and the transmission of codewords of a LDPC code mapped on the second layer. Now suppose that the estimated SNR at the receiver side is 11 dB, which is less than the robustness of the second layer. Therefore, the receiver may not be able to decode the codeword, and sends back a NACK, through which it asks for retransmission of N codeword bits mapped on the first layer. To compute the number of the needed bits for retransmission (i.e. N), one can consider the results of FIG. 10. According to the FIG. 10, if the transmitter 100 could only transmit 20% of the codeword bits on the first layer, the transmission robustness would improve to 11 dB. Therefore, by considering the first transmission and asking for retransmission of 20% of codeword bits mapped on the first layer, the receiver can decode the codeword. This example can be generalized: Knowing that for every 10% of codeword bits that are mapped on first layer instead of the second layer, the robustness of the transmission increases by about 0.6 dB, for the case of mapping codeword bits on the second layer, and the estimated SNR at the receiver less than 12 dB, to be able to decode the codeword, the receiver can ask for retransmission of n % of the codeword bits mapped on the first layer, wherein $$n = \left\lfloor \frac{(12 - SNR_{[dB]})}{0.6} \right\rfloor 10.$$

In a variant, the bracket (which denotes the floor function) may be replaced by a ceiling function or may be omitted, i.e., without discretization (at least at this point of the computation).

Note that a very similar method can be considered to find of the needed bits for retransmission (i.e. N), for transmission of codeword bits mapped on the other layers.

A fourth embodiment 4 uses the portions for combining layers to increase robustness.

One of the advantages with using multi-layer transmission is that one may largely use the same modulation (and coding) all the time, and instead the link adaptation is effectively made by selecting how the bits in the codewords are transmitted on the different layers.

Although the most robust layer typically is sufficiently robust for the typical channel conditions, there may be situations where further robustness would be desirable in order to allow for a codeword can be correctly received without the need for relatively large number of retransmissions.

Figure 11B:
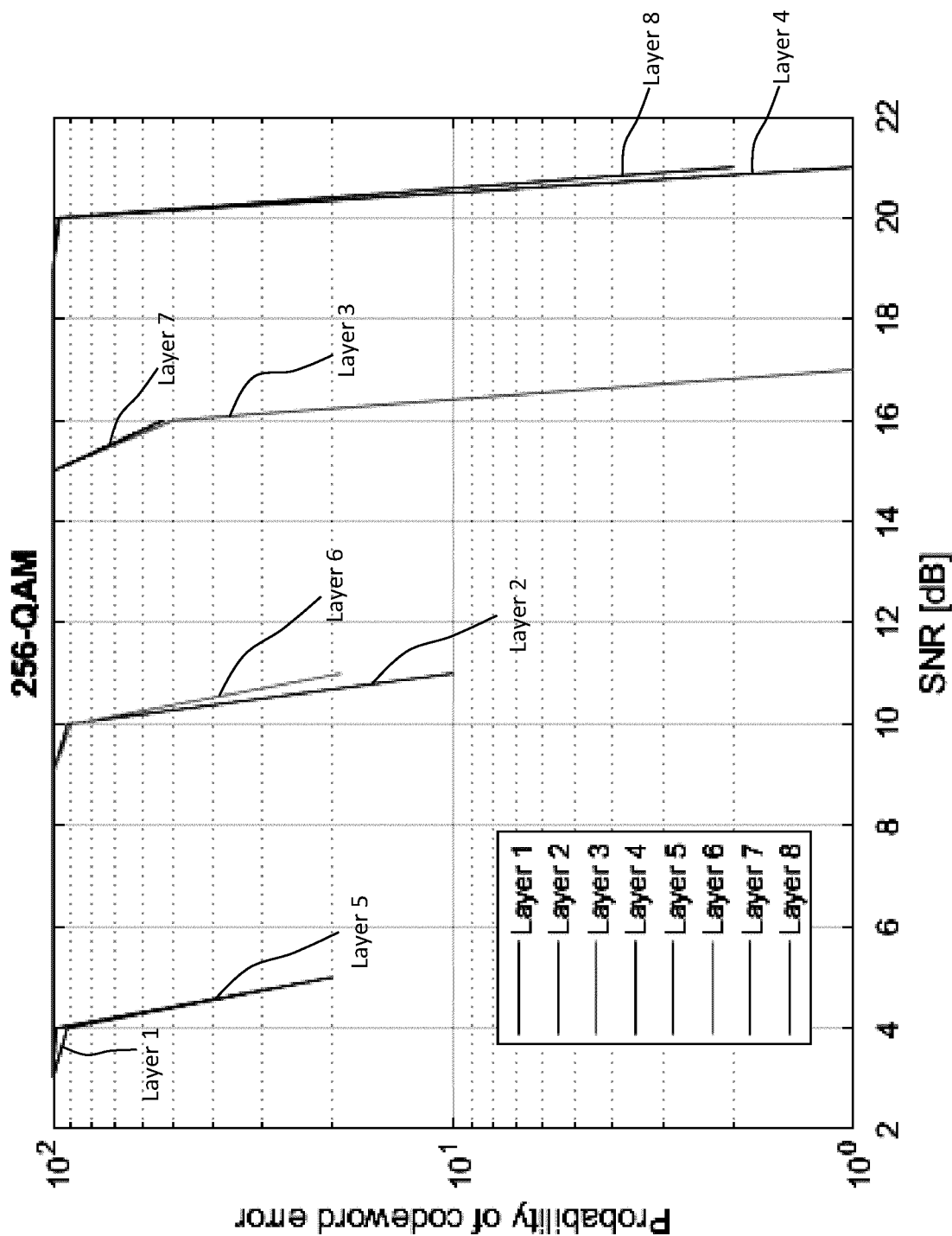
FIG. 11B shows a diagram schematically illustrating exemplary error rates or codeword error probabilities of 4 different layers (or 4 different pairs of layers) of a multi-layer transmission.

FIG. 11B. Illustration is an illustration of how the codeword error probability for codewords transmitted on different layers varies with the SNR [dB] of the received signal in case of 256-QAM.

According to this embodiment, a codeword is transmitted by sending some of the bits on more than one layer, so that the receiver can combine the information obtained on the different layers when doing the decoding. One may view this as (partial) repetition coding across layers. As a specific example, suppose 256-QAM is used. This means that in total 8 layers can be transmitted in parallel. For a typical Gray mapping, the robustness of the 8 layers are such that there are 4 different robustness levels, each with 2 layers. Simulation results with a LDPC code using multi-layer modulation are shown in FIG. 11B.

As can be seen in the FIG. 11B, the two most robust layers (collectively referred to as first layer 902) require about 5 dB SNR (e.g., as the first threshold value). The two following layers (collectively referred to as second layer 904) need about 6 dB more, i.e. 11 dB (e.g., as the second threshold value). The next two layers (collectively referred to as third layer 906) need yet another 6 dB, i.e. 17 dB (e.g., as the third threshold value). Finally, the two last layers (collectively referred to as fourth layer 908) transmitted with the least robustness require roughly 21 dB (e.g., as the fourth threshold value).

Suppose one would know that the SNR at the receiver 200 is 2 dB. Obviously, even the most robust layer 902 will not be successfully decoded in this case. Rather, one would typically have to combine two transmission, wherein the codeword 802 has been transmitted using the most robust layer. According to the present embodiment, this combination is instead done already in the first transmission 302 by transmitting the same codeword 802 on the two most robust layers, e.g., 902 and 904. At the receiver 200, the information obtained from the two received codewords 802 are then combined (e.g., soft-combined) when performing the decoding. Although one can do this in different ways, the most straight-forward way to do it is to combine the soft information (e.g., add the log-likelihood values) for the two codewords before doing the actual decoding of the LDPC code.

In an alternative example, it is estimated that the SNR at the receiver is 10.5 dB, so just below what is considered sufficient for codewords transmitted on third layer 906 and fourth layer 908. If one then would like to avoid a retransmission of the packet, one could of course select to send the codeword on first layer 902 or the second layer 904. However, this would be very wasteful. Alternatively, one could make use of the approach disclosed in first embodiment, and instead of transmitting the entire codeword using third layer 906 or the fourth layer 908, select to transmit a fraction of the bits (i.e., the first and second portions) using the first layer 902 or the second layer 904, such that the effective robustness of the codeword would be sufficient for a SNR of 10.5 dB.

Figure 11C:
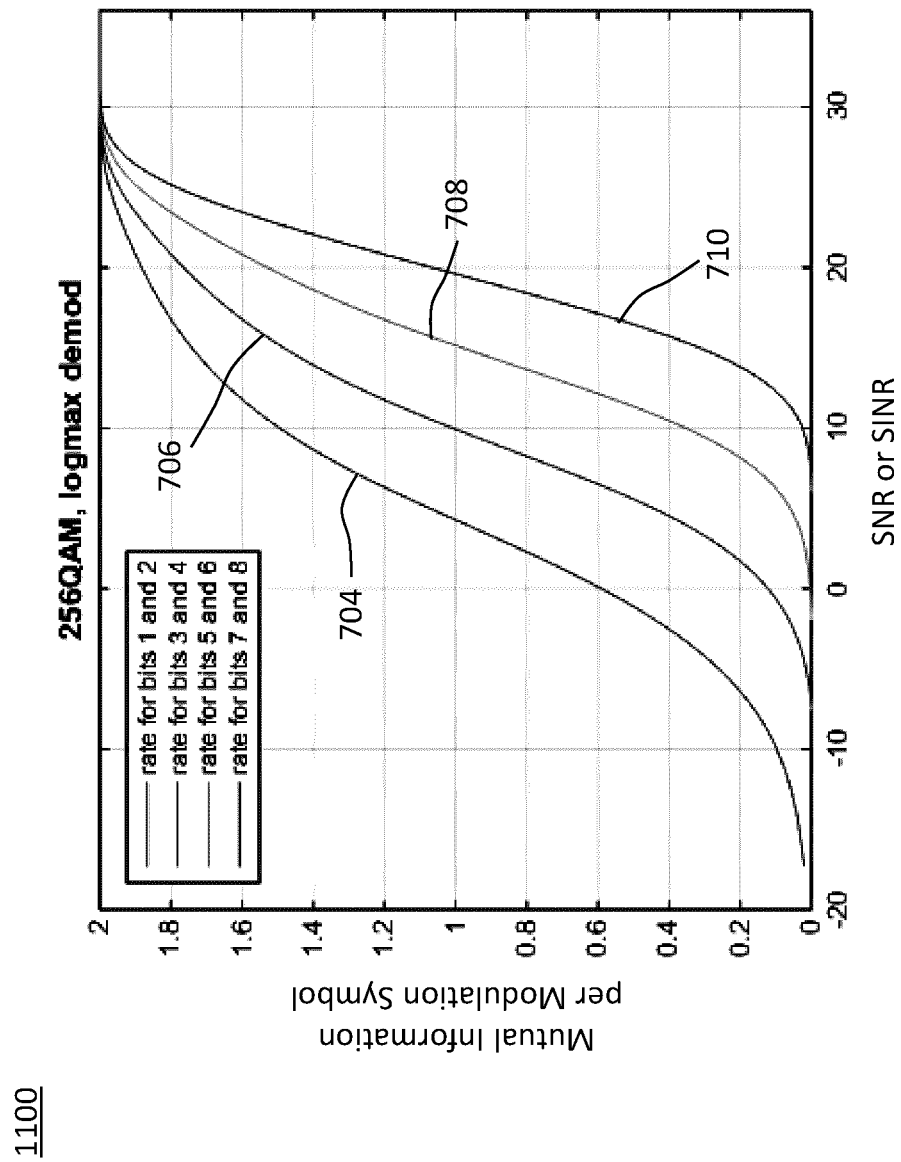
FIG. 11C shows a diagram schematically illustrating exemplary robustnesses or portions of mutual information of four layers of a multi-layer transmission.

FIG. 11C schematically illustrates how the information rate for the different layers (e.g., the corresponding bits) varies with the SNR or the SINR (in units of dB) of the received signal in case of 256-QAM. Information rates 704 to 710 (e.g., portions of the mutual information) for four layers, respectively, are schematically illustrated as functions of the SNR or the SINR for the multi-layer transmission using a 256-QAM. As can be seen in FIG. 11, each of the 8 bits per modulation symbol falls in one of four categories with around 5 dB difference between two adjacent categories, implying that the difference between the bits carrying the most information and the bits carrying the least amount of information is about 15 dB. More specifically, the information rates 704, 706, 708 and 710 correspond to the groups of bits (1, 2), (3, 4), (5, 6), and (7, 8), respectively.

Figure 12:
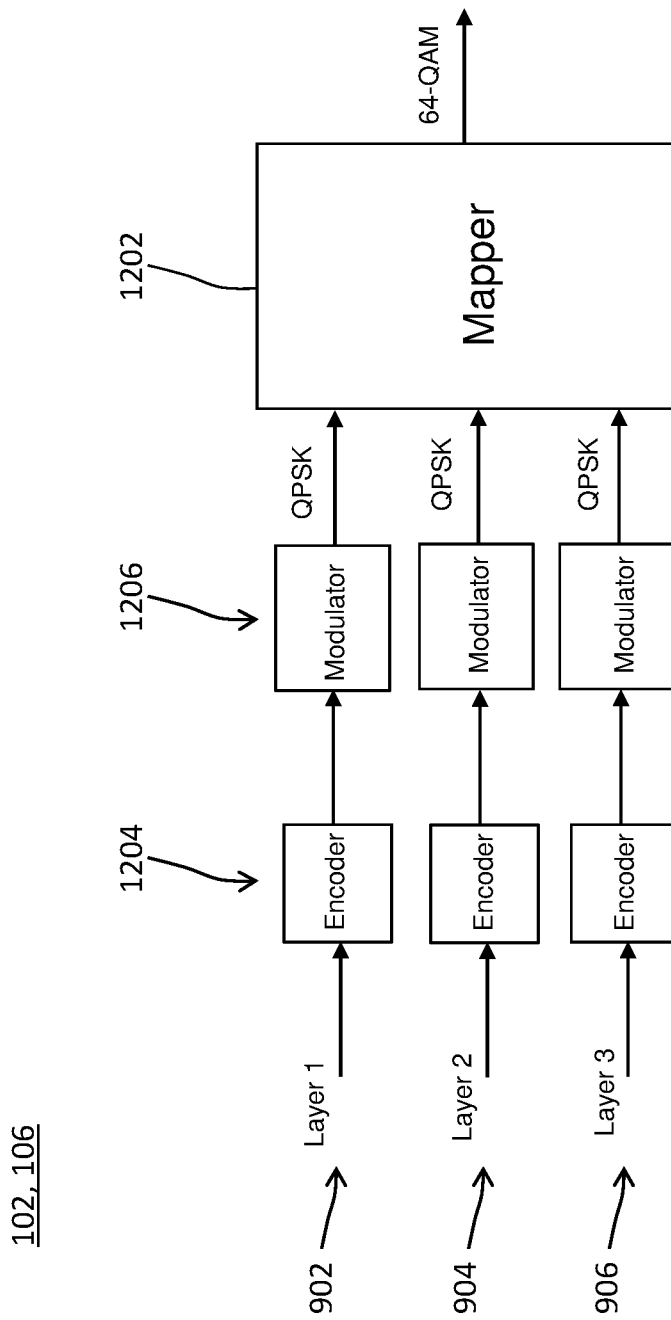
FIG. 12 schematically illustrates an exemplary embodiment, in which data of different HARQ processes is hierarchically mapped to the layers of the multi-layer transmission.

FIG. 12 schematically illustrates an example of a block diagram for implementing at least one of the multi-layer transmission module 102 and/or the multi-layer retransmission module 106 at the transmitter 100. For example, the same unit may be configured to perform both the step 302 and the step 306. Features corresponding to those disclosed in the context of FIG. 12 may be implemented at the receiver 200.

The multi-layer transmission 302 and/or 306 may be implemented using a multiplexer (MUX) and/or a constellation mapper 1202. The MUX may map the data of different HARQ processes to the respective layer, e.g., according to the state of the HARQ processes, the feedback message and/or the amount of missing information for correctly decoding the respective data. The mapper 1202 assigns partial modulation symbols in a hierarchical constellation to groups of bits representing the respective data of the respective layers. For example, some bits in the constellation of a Gray-mapped QAM are more robust than others. Thus, bits corresponding to the first data (e.g. a first message) may be mapped to one or more first partial modulation symbols defining the first layer (e.g., a first bit group in the Gray-mapped QAM symbols), while bits corresponding to the second data (e.g. a second message) may be mapped to one or more second partial modulation symbols (e.g., a second bit group in the Gray-mapped QAM symbols) that are less robust than the first partial modulation symbols.

The multi-layer transmission 302 and/or 306 may be further implemented using, for each of the multiple layers 902 to 906, an encoder 1204 and/or a modulator 1206. Each encoder 1204 is configured to encode the respective data of the respective layer, e.g., resulting in a corresponding codeword. Each modulator 1206 is configured to generate the respective partial modulation symbol for the respective one of the multiple layers 902 to 906.

In FIG. 12, the encoders 1204 may or may not be identical. In principle, completely different codes may be used for the different layers 902 to 906 such that, e.g. the first layer 902 is using a convolutional code, whereas the second layer 904 and the third layer 906 are using LDPC codes. It may also be so that the layers are using the same type of code, e.g. LDPC, but the code rates used for the different layers may be different.

Typically, the larger the modulation alphabet, the larger the difference between the information rates (e.g., the portions of the mutual information) carried by different bits. In case it is desirable to have a large difference between the information rates carried by the different bits without using a very large modulation alphabet this can be achieved by using non-uniform signal constellations.

Figure 13:
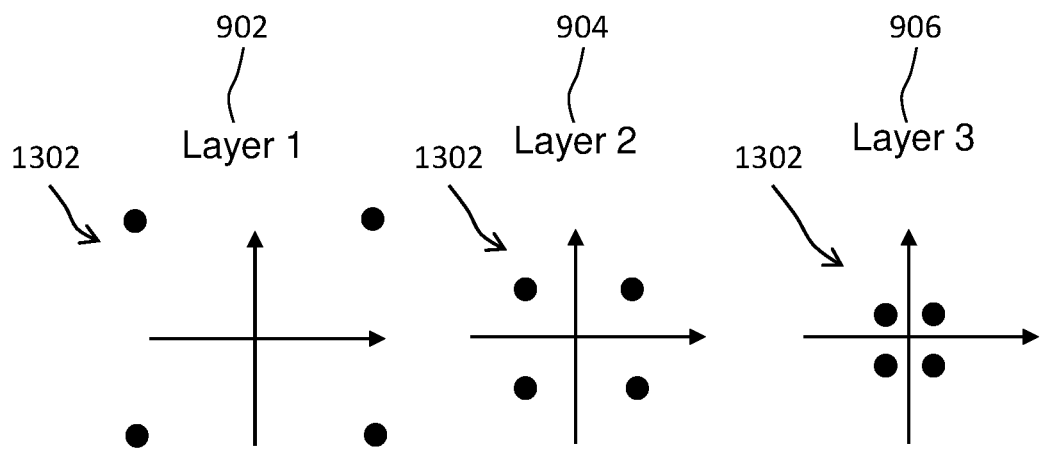
FIG. 13 schematically illustrates exemplary constellation diagrams for partial modulation symbols corresponding to different layers, respectively.
Figure 14:
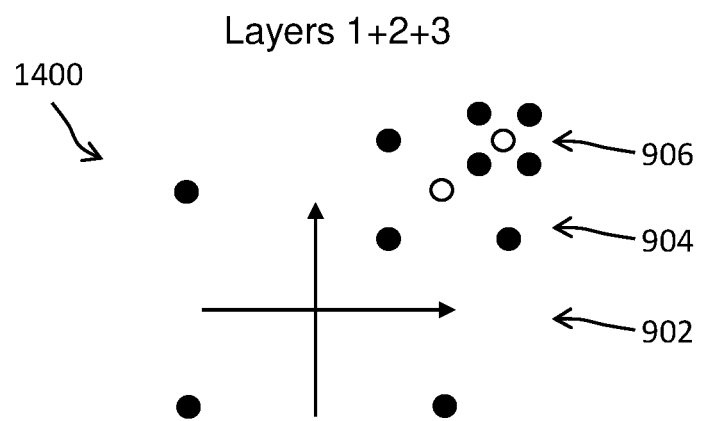
FIG. 14 schematically illustrates an exemplary constellation diagram for one modulation symbol resulting from combining partial modulation symbols corresponding to different layers, respectively.

FIGS. 13 and 14 schematically illustrate a first example for generating a non-uniform constellation. This approach may assign different bits different reliability, which may be different from exploiting Gray coding.

In the first example, by way of illustration and without limitation, the data is encoded, modulated and/or transmitted in three layers 902, 904 and 906. Each of the multiple layers is encoded and/or modulated by the respective encoder 1204 and modulator 1206, e.g., using quadrature phase-shift keying (QPSK) in each of the multiple layers, resulting in a partial modulation symbol 1302 for the respective layer.

The final signal constellation point is obtained by superposition (e.g., addition in the complex plane) of the multiple partial modulation symbols 1302 (e.g., the three QPSK signals), resulting in the modulation symbol 1400 schematically illustrated in FIG. 14.

The difference in the robustness (e.g., the portion of the mutual information and/or the reliability) between the different layers may be controlled by transmitting and/or combining the multiple layers with different powers (e.g., by combining the partial modulation symbols with different amplitudes), e.g., as schematically illustrated in FIGS. 13 and 14.

More specifically, FIG. 13 illustrates the modulation used for each of the multiple layers, e.g., each comprising 2 bits for a partial modulation alphabet of size 4.

FIG. 14 illustrates how the multiple layers 902 to 906 are combined to generate one of modulation symbol 1400 of the modulation alphabet, e.g., one of 64 possible modulation symbols. The multi-layer transmission is implemented as a hierarchical modulation, since the multiple layers are combined and transmitted with different powers.

The following implementations of the feedback message transmitted in the step 304 and received in the step 404 may be applied to any embodiment described herein. Particularly, the feedback message may be indicative of additional information (e.g., the amount of additional information) that is required for correctly decoding the respective data of any one of the HARQ processes.

The basic idea with multi-level HARQ is to have a coding scheme that is better matched to the actual channel conditions. By using two or more layers of the multi-layer transmission, more freedom is obtained, which can be exploited when the channel conditions are changing and therefore may be largely unknown for the receiver at the time for the transmission.

In one embodiment, the HARQ processes are mapped to the respective layers and/or the robustnesses of the respective layers are controlled so that the multi-layer transmission of each layer is decodable (e.g., based on SNR or SINR reported in the feedback message), but not with a large margin since such a large margin essentially implies that the channel has not been effectively used.

The feedback message may be a means to not have a too large margin (e.g., in terms of additional information) when transmitting the respective data on the respective layer at the transmitter and when decoding the respective data received on the respective layer at the receiver 200.

For example, the HARQ processes (e.g., the corresponding data) are mapped to the respective layers and/or the robustnesses of the respective layers are controlled or changed based on the feedback message. The feedback message enables the transmitter 100 to control or change at least one of the robustnesses of the multiple layers and the mapping of the HARQ processes to the multiple layers.

By means of the feedback message, the receiver 200 feeds back information to the transmitter 100 regarding how far from successful decoding a layer (or the corresponding HARQ process) is. In other words, the receiver 200 determines the amount of additional information required for correctly decoding the respective data. In case the receiver 200 determines that a certain amount of additional information is required, the feedback message is indicative of the amount of additional information (e.g., which implies no positive acknowledgment for the respective data).

The feedback message may enable the transmitter 100 to retransmit the particular data (e.g., either on the same layer or another layer that is more appropriate in terms of the required additional information) in a way that only or essentially the additional information is provided to the receiver 200. For example, the retransmission in the step 306 may provide at most 110%, 150% or 200% (i.e., twice) the amount of the required additional information. More specifically, the provided amount of additional information may be (1+x) the amount of the required additional information (e.g., based on the feedback message), wherein $0 < x < 1$ depends on the variance (e.g., the standard deviation) of the SNR or the SINR (e.g. based on the feedback message).

For example, if the feedback message indicates that only a fraction of the initial information of the respective data (e.g., only a little amount of additional information) is required as additional information for correctly decoding, the transmitter 100 may select for the retransmission in the step 306 the same layer previously used for the (e.g., initial) transmission 302 or a layer having less robustness than the layer used for the initial transmission 302. On the contrary, if the feedback message indicates that substantially the initial information of the respective data (e.g., more than 50% or 90% of the initial information, or a lot of additional information) is required for successfully decoding of the respective data, this information is transmitted back to the transmitter 100 in the feedback message. Responsive to the feedback message, the transmitter 100 may allocate a layer (i.e., map a layer to the respective HARQ process) that is more reliable than the layer used in transmission 302 for the retransmission of the respective data.

One or more parameters for the multi-layer HARQ transmission 302 and/or 306 may be fed back or reported to the transmitter 100 in the feedback message. The one or more parameters may comprise at least one of a SNR at the receiver 200; a SINR at the receiver 200; at least one control parameter for controlling the (e.g., relative or absolute) robustnesses of the multiple layers; and an indicator indicative of the amount of the additional information required for correctly decoding the respective data of the respective HARQ process. The feedback message may be implemented as a (e.g., backward compatible) extension of the ACK or NACK feedback. The one or more parameters may be included or appended to the ACK or NACK feedback as additional information. For example, instead of using one bit for a conventional ACK or NACK feedback, one byte may be used. The additional information may be indicative of how close any one or each of the HARQ processes (i.e., the respective data, e.g. a data packet) was to be correctly decoded.

Any of the one or more parameters and/or the amount of addition information required for correctly decoding may be computed on the PHY layer, e.g., in functional relation to the decoding of the respective data (e.g., the receptive codeword). For example, the decoding and the computing of the one or more parameters for the feedback message may take place on the same layer. The feedback message may also be referred to as multi-layer HARQ feedback.

Figure 15:
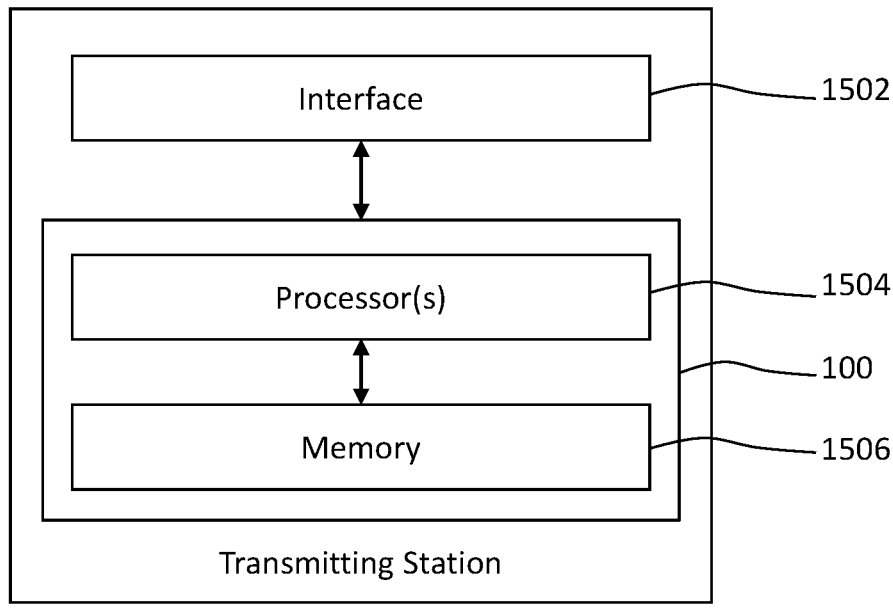
FIG. 15 shows a schematic block diagram of a transmitting station embodying the device of FIG. 1.

FIG. 15 shows a schematic block diagram for an embodiment of the device 100. The device 100 comprises one or more processors 1504 for performing the method 300 and memory 1506 coupled to the processors 1504. For example, the memory 1506 may be encoded with instructions that implement at least one of the modules 102, 104 and 106.

The one or more processors 1504 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1506, transmitter functionality. For example, the one or more processors 1504 may execute instructions stored in the memory 1506. Such functionality may include providing various features and steps discussed herein, including any of the benefits disclosed herein. The expression "the device being operative to perform an action" may denote the device 100 being configured to perform the action.

As schematically illustrated in FIG. 15, the device 100 may be embodied by a transmitting station 1500, e.g., functioning as a transmitting base station or a transmitting UE. The transmitting station 1500 comprises a radio interface 1502 coupled to the device 100 for radio communication with one or more receiving stations, e.g., functioning as a receiving base station or a receiving UE.

Figure 16:
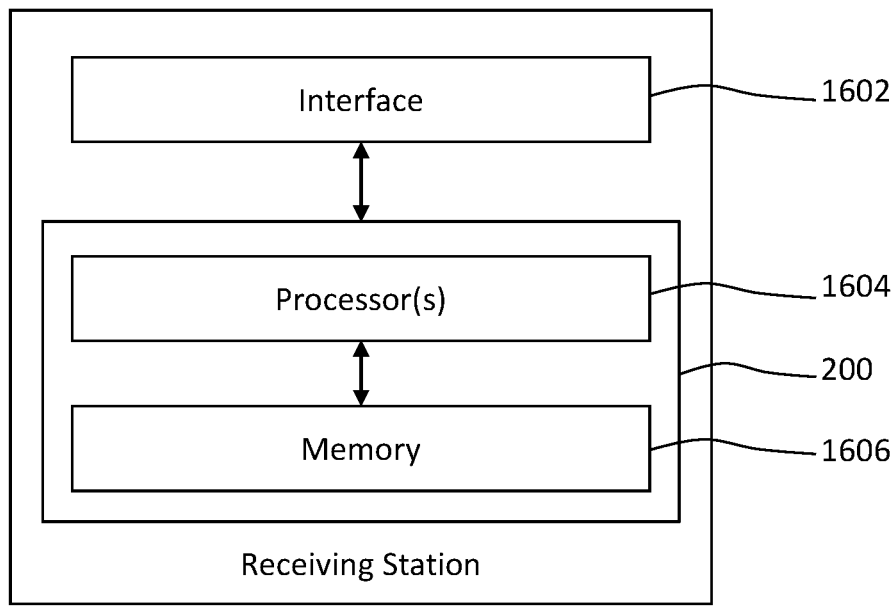
FIG. 16 shows a schematic block diagram of a receiving station embodying the device of FIG. 2.

FIG. 16 shows a schematic block diagram for an embodiment of the device 200. The device 200 comprises one or more processors 1604 for performing the method 400 and memory 1606 coupled to the processors 1604. For example, the memory 1606 may be encoded with instructions that implement at least one of the modules 202, 204 and 206.

The one or more processors 1604 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1606, receiver functionality. For example, the one or more processors 1604 may execute instructions stored in the memory 1606. Such functionality may include providing various features and steps discussed herein, including any of the benefits disclosed herein. The expression "the device being operative to perform an action" may denote the device 200 being configured to perform the action.

As schematically illustrated in FIG. 16, the device 200 may be embodied by a receiving station 1600, e.g., functioning as a receiving base station or a receiving UE. The receiving station 1600 comprises a radio interface 1602 coupled to the device 200 for radio communication with one or more transmitting stations, e.g., functioning as a transmitting base station or a transmitting UE.

Figure 17:
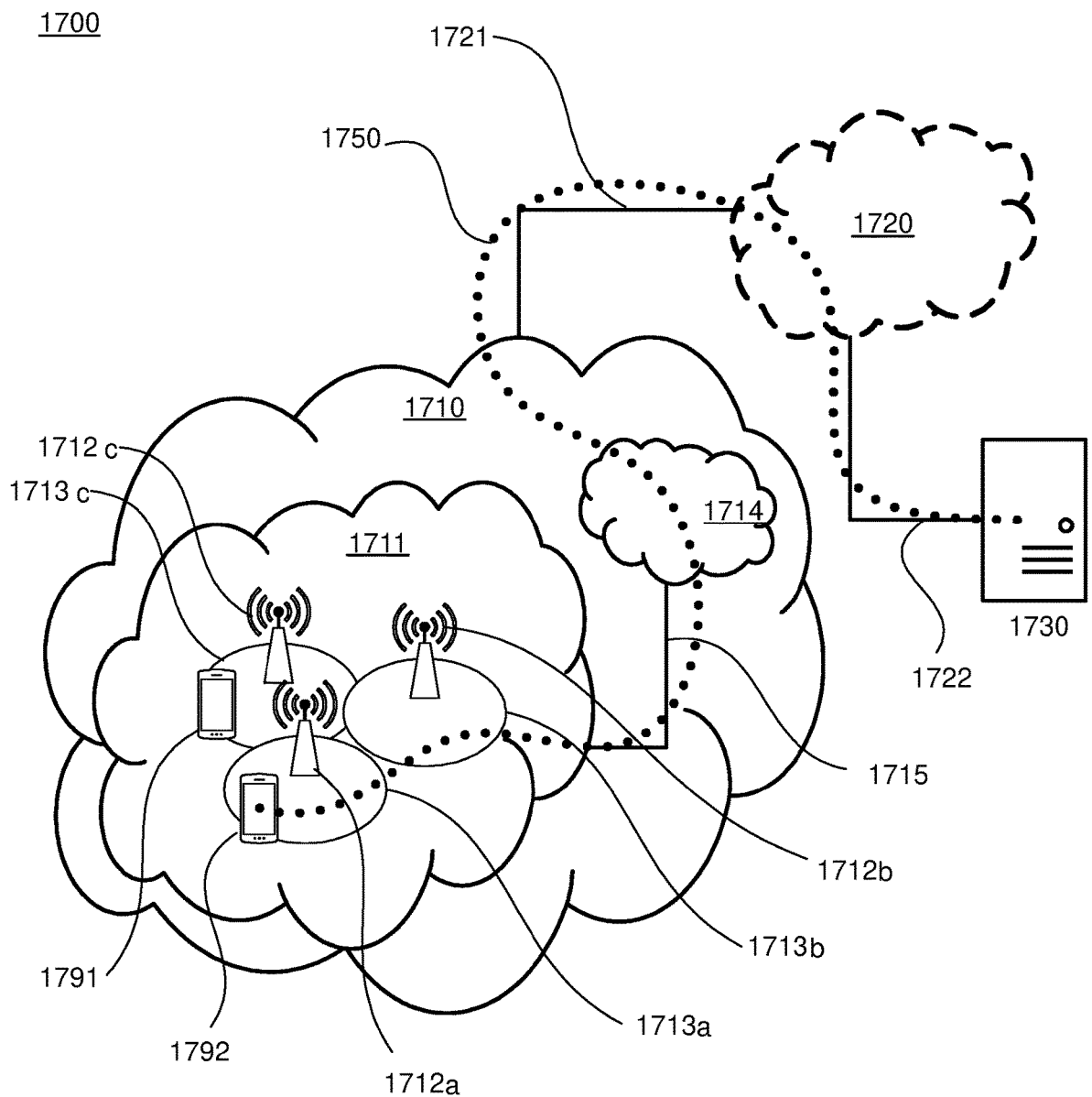
FIG. 17 schematically illustrates an example telecommunication network connected via an intermediate network to a host computer.

With reference to FIG. 17, in accordance with an embodiment, a communication system 1700 includes a telecommunication network 1710, such as a 3GPP-type cellular network, which comprises an access network 1711, such as a radio access network, and a core network 1714. The access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to the core network 1714 over a wired or wireless connection 1715. A first user equipment (UE) 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Any of the base stations 1712 and the UEs 1791, 1792 may embody the device 100.

The telecommunication network 1710 is itself connected to a host computer 1730, which may be embodied in the hardware and/or software of a standalone server, a cloud-implemented server, a distributed server or as processing resources in a server farm. The host computer 1730 may be under the ownership or control of a service provider, or may be operated by the service provider or on behalf of the service provider. The connections 1721, 1722 between the telecommunication network 1710 and the host computer 1730 may extend directly from the core network 1714 to the host computer 1730 or may go via an optional intermediate network 1720. The intermediate network 1720 may be one of, or a combination of more than one of, a public, private or hosted network; the intermediate network 1720, if any, may be a backbone network or the Internet; in particular, the intermediate network 1720 may comprise two or more sub-networks (not shown).

The communication system 1700 of FIG. 17 as a whole enables connectivity between one of the connected UEs 1791, 1792 and the host computer 1730. The connectivity may be described as an over-the-top (OTT) connection 1750. The host computer 1730 and the connected UEs 1791, 1792 are configured to communicate data and/or signaling via the OTT connection 1750, using the access network 1711, the core network 1714, any intermediate network 1720 and possible further infrastructure (not shown) as intermediaries. The OTT connection 1750 may be transparent in the sense that the participating communication devices through which the OTT connection 1750 passes are unaware of routing of uplink and downlink communications. For example, a base station 1712 need not be informed about the past routing of an incoming downlink communication with data originating from a host computer 1730 to be forwarded (e.g., handed over) to a connected UE 1791. Similarly, the base station 1712 need not be aware of the future routing of an outgoing uplink communication originating from the UE 1791 towards the host computer 1730.

By virtue of the method 200 being performed by any one of the UEs 1791 or 1792 and/or any one of the base stations 1712, the performance of the OTT connection 1750 can be improved, e.g., in terms of increased throughput and/or reduced latency. More specifically, the host computer 1730 may indicate the AC 302 for the user data being a piece of the data in the multi-layer transmission 208.

Example implementations, in accordance with an embodiment of the UE, base station and host computer discussed in the preceding paragraphs, will now be described with reference to FIG. 18. In a communication system 1800, a host computer 1810 comprises hardware 1815 including a communication interface 1816 configured to set up and maintain a wired or wireless connection with an interface of a different communication device of the communication system 1800. The host computer 1810 further comprises processing circuitry 1818, which may have storage and/or processing capabilities. In particular, the processing circuitry 1818 may comprise one or more programmable processors, application-specific integrated circuits, field programmable gate arrays or combinations of these (not shown) adapted to execute instructions. The host computer 1810 further comprises software 1811, which is stored in or accessible by the host computer 1810 and executable by the processing circuitry 1818. The software 1811 includes a host application 1812. The host application 1812 may be operable to provide a service to a remote user, such as a UE 1830 connecting via an OTT connection 1850 terminating at the UE 1830 and the host computer 1810. In providing the service to the remote user, the host application 1812 may provide user data, which is transmitted using the OTT connection 1850. The user data may depend on the location of the UE 1830. The user data may comprise auxiliary information or precision advertisements (also: ads) delivered to the UE 1830. The location may be reported by the UE 1830 to the host computer, e.g., using the OTT connection 1850, and/or by the base station 1820, e.g., using a connection 1860.

The communication system 1800 further includes a base station 1820 provided in a telecommunication system and comprising hardware 1825 enabling it to communicate with the host computer 1810 and with the UE 1830. The hardware 1825 may include a communication interface 1826 for setting up and maintaining a wired or wireless connection with an interface of a different communication device of the communication system 1800, as well as a radio interface 1827 for setting up and maintaining at least a wireless connection 1870 with a UE 1830 located in a coverage area (not shown in FIG. 18) served by the base station 1820. The communication interface 1826 may be configured to facilitate a connection 1860 to the host computer 1810. The connection 1860 may be direct, or it may pass through a core network (not shown in FIG. 18) of the telecommunication system and/or through one or more intermediate networks outside the telecommunication system. In the embodiment shown, the hardware 1825 of the base station 1820 further includes processing circuitry 1828, which may comprise one or more programmable processors, application-specific integrated circuits, field programmable gate arrays or combinations of these (not shown) adapted to execute instructions. The base station 1820 further has software 1821 stored internally or accessible via an external connection.

The communication system 1800 further includes the UE 1830 already referred to. Its hardware 1835 may include a radio interface 1837 configured to set up and maintain a wireless connection 1870 with a base station serving a coverage area in which the UE 1830 is currently located. The hardware 1835 of the UE 1830 further includes processing circuitry 1838, which may comprise one or more programmable processors, application-specific integrated circuits, field programmable gate arrays or combinations of these (not shown) adapted to execute instructions. The UE 1830 further comprises software 1831, which is stored in or accessible by the UE 1830 and executable by the processing circuitry 1838. The software 1831 includes a client application 1832. The client application 1832 may be operable to provide a service to a human or non-human user via the UE 1830, with the support of the host computer 1810. In the host computer 1810, an executing host application 1812 may communicate with the executing client application 1832 via the OTT connection 1850 terminating at the UE 1830 and the host computer 1810. In providing the service to the user, the client application 1832 may receive request data from the host application 1812 and provide user data in response to the request data. The OTT connection 1850 may transfer both the request data and the user data. The client application 1832 may interact with the user to generate the user data that it provides.

Figure 18:
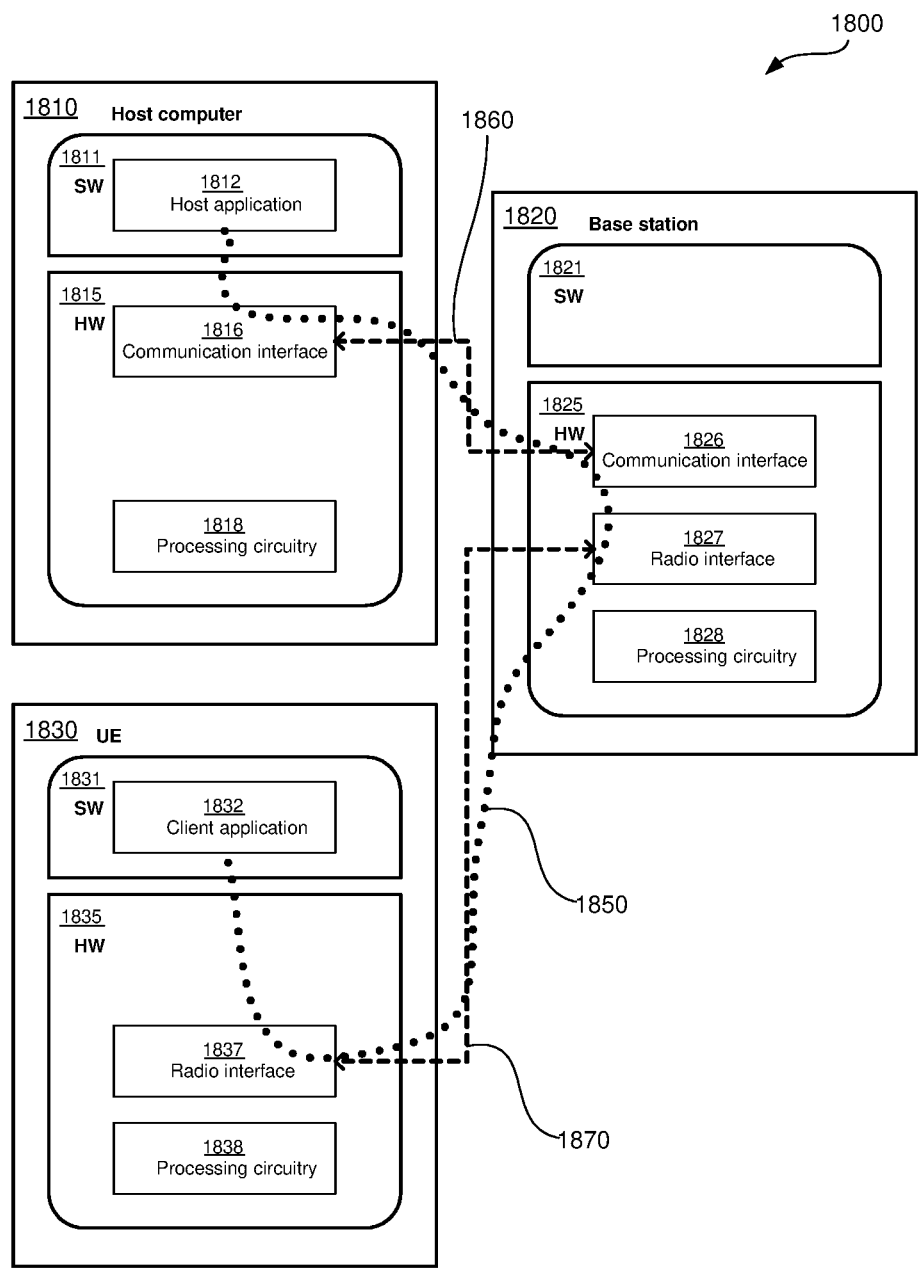
FIG. 18 shows a generalized block diagram of a host computer communicating via a base station or radio device functioning as a gateway with a user equipment over a partially wireless connection.

It is noted that the host computer 1810, base station 1820 and UE 1830 illustrated in FIG. 18 may be identical to the host computer 1730, one of the base stations 1712a, 1712b, 1712c and one of the UEs 1791, 1792 of FIG. 17, respectively. This is to say, the inner workings of these entities may be as shown in FIG. 18, and, independently, the surrounding network topology may be that of FIG. 17.

In FIG. 18, the OTT connection 1850 has been drawn abstractly to illustrate the communication between the host computer 1810 and the UE 1830 via the base station 1820, without explicit reference to any intermediary devices and the precise routing of messages via these devices. Network infrastructure may determine the routing, which it may be configured to hide from the UE 1830 or from the service provider operating the host computer 1810, or both. While the OTT connection 1850 is active, the network infrastructure may further take decisions by which it dynamically changes the routing (e.g., on the basis of load balancing consideration or reconfiguration of the network).

The wireless connection 1870 between the UE 1830 and the base station 1820 is in accordance with the teachings of the embodiments described throughout this disclosure. One or more of the various embodiments improve the performance of OTT services provided to the UE 1830 using the OTT connection 1850, in which the wireless connection 1870 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1850 between the host computer 1810 and UE 1830, in response to variations in the measurement results. The measurement procedure and/or the network functionality for reconfiguring the OTT connection 1850 may be implemented in the software 1811 of the host computer 1810 or in the software 1831 of the UE 1830, or both. In embodiments, sensors (not shown) may be deployed in or in association with communication devices through which the OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of the OTT connection 1850 may include message format, retransmission settings, preferred routing etc.; the reconfiguring need not affect the base station 1820, and it may be unknown or imperceptible to the base station 1820. Such procedures and functionalities may be known and practiced in the art. In certain embodiments, measurements may involve proprietary UE signaling facilitating the host computer's 1810 measurements of throughput, propagation times, latency and the like. The measurements may be implemented in that the software 1811, 1831 causes messages to be transmitted, in particular empty or "dummy" messages, using the OTT connection 1850 while it monitors propagation times, errors etc.

Figures 19, 20:
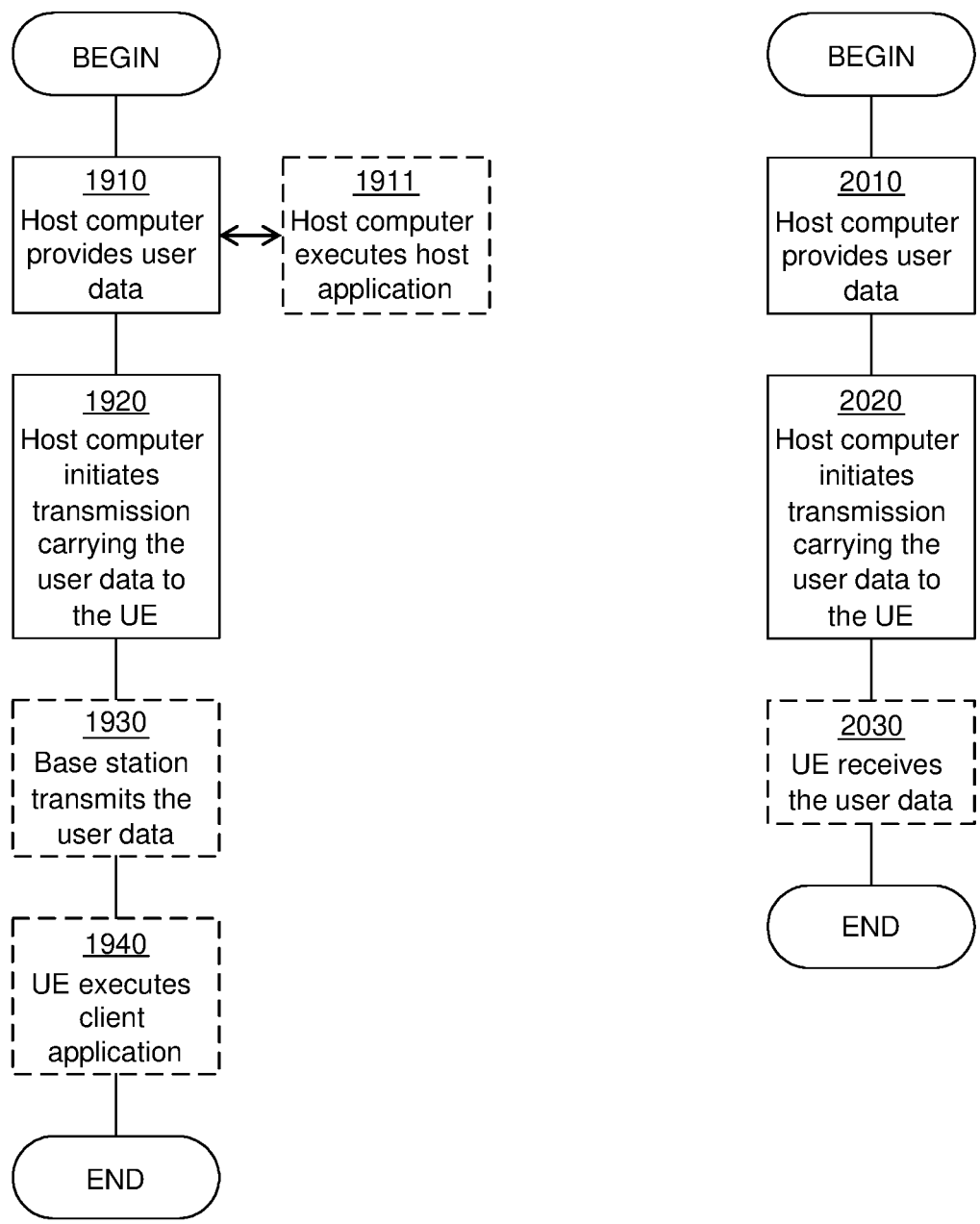
FIGS. 19 and 20 show flowcharts for methods implemented in a communication system including a host computer, a base station or radio device functioning as a gateway and a user equipment.

FIG. 19 is a flowchart illustrating a method implemented in a communication system, in accordance with one embodiment. The communication system includes a host computer, a base station and a UE, which may be those described with reference to FIGS. 17 and 18. For simplicity of the present disclosure, only drawing references to FIG. 19 will be included in this paragraph. In a first step 1910 of the method, the host computer provides user data. In an optional substep 1911 of the first step 1910, the host computer provides the user data by executing a host application. In a second step 1920, the host computer initiates a transmission carrying the user data to the UE. In an optional third step 1930, the base station transmits to the UE the user data which was carried in the transmission that the host computer initiated, in accordance with the teachings of the embodiments described throughout this disclosure. In an optional fourth step 1940, the UE executes a client application associated with the host application executed by the host computer.

FIG. 20 is a flowchart illustrating a method implemented in a communication system, in accordance with one embodiment. The communication system includes a host computer, a base station and a UE, which may be those described with reference to FIGS. 17 and 18. For simplicity of the present disclosure, only drawing references to FIG. 20 will be included in this paragraph. In a first step 2010 of the method, the host computer provides user data. In an optional substep (not shown) the host computer provides the user data by executing a host application. In a second step 2020, the host computer initiates a transmission carrying the user data to the UE. The transmission may pass via the base station, in accordance with the teachings of the embodiments described throughout this disclosure. In an optional third step 2030, the UE receives the user data carried in the transmission.

In any embodiment may be implemented by a method for transmission of data from one transmitter to one receiver. The first data may be transmitted using multiple layers and that more than one layer is used for the transmission of the first data (e.g., a codeword). The bits in the codeword may be transmitted on two layers with different robustness, wherein each bit is only transmitted on one of the layers.

The fraction of bits (i.e., the first and second portions) transmitted on the respective layer may be determined based on the expected or reported SNR at the receiver.

The number of bits for the respective layers may be determined using a step-wise linear and/or monotonic function.

Optionally, the bits in a codeword may be transmitted on two layers, and where each of the bits in the codeword are transmitted on the two layers. The two layers may have the same robustness, or the two layers have different robustnesses.

Preferably, some of the bits in the codewords are transmitted on only one layer, whereas other bits of the codeword are transmitted on more than one layer.

The transmission may be based on HARQ. The transmission may be a first or initial transmission or a retransmission. Optionally, a selection of what layers to use for the retransmission is in part determined based on the feedback message from the receiver, e.g., indicative of about how much additional information is needed for successful decoding.

Any feature or step disclosed herein for the transmitter 100 may have a corresponding feature or step at the receiver 200, e.g., where applicable.

In any embodiment, data may be transmitted from one transmitter to one receiver. The data may be transmitted using multiple layers, wherein the robustnesses of the different layers are pairwise different. This difference in robustness may be taken into account for selecting which data or portion of the data to transmit on which of the multiple layers. Furthermore, the multi-layer transmission uses HARQ for at least one of the layers.

When selecting parameters for the multi-layer transmission, e.g., the sizes of the portions of the data distributed over two or more layers, information related to whether a layer carries new data or retransmitted data is taken into account.

When a layer or a combination of two or more layers is to be used for retransmission of data, the data carried by the layer used for the retransmission is selected based on how much additional information is expected to be needed to result in that the data can be correctly decoded at the receiver.

The receiver may receive data transmitted on at least one layer of a multi-layer transmission using HARQ. Upon trying to decode the received data, the receiver may generate at least one parameter (also: metric, e.g., in the feedback message) representative of how far from successful the receiver is.

The parameter may correspond to a number of additional bits that are needed by the receiver. Alternatively or in addition, the parameter may correspond to a SNR value needed for a received signal encoded with the retransmitted data. Alternatively or in addition, the parameter may correspond to a specific layer to be used when retransmitting the respective data. Alternatively or in addition, the parameter may correspond to a control parameter for controlling the robustnesses of the layers in a non-uniform constellation. Alternatively or in addition, the parameter may correspond to the number of layers.

The technique may be implemented as a coded system. By way of example, a data packet may comprise a plurality of coded modulation symbols, e.g., on the order of 1000 modulation symbols. Each modulation symbol may result from a combination of multiple (e.g., two, three or more) partial modulation symbols. Each modulation symbol may have multiple (e.g., two, three or more) layers, e.g., in one-to-one correspondence with the multiple partial modulation symbols.

Furthermore, multi-layer modulation parameters may be selected. The performance of the more robust layers (e.g., the layer associated with the second least power level) can become worse if additional layers are added. Thus, it may be important to not use too many layers. The technique may be implemented to control the parameters of the multi-layer modulation (particularly, the number of layers), e.g., resulting in improved reliability and/or throughput of the data transmission.

As has become apparent from above description, embodiments of the technique allow for improved spectrum efficiency and reduced delay at a very low additional complexity. The invention is particularly suitable for operation in unlicensed bands where it can be expected that the receiver conditions are highly varying and therefore hard to predict.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing a multi-intra-symbol-layer transmission from a transmitting station to a receiving station on a radio frequency, wherein each of a plurality of intra-symbol layers of a same modulation symbol has different robustnesses on the radio frequency, the method comprising:
    transmitting, on a first intra-symbol layer of the multi-intra-symbol-layer transmission, a first portion of first data and a first portion of second data and, simultaneously on a second intra-symbol layer of the multi-intra-symbol-layer transmission, a second portion of the first data and a second portion of the second data;
    wherein a size of the first portion of the first data, the second portion of the first data, the first portion of the second data, and/or the second portion of the second data depends on a signal to noise ratio (SNR) and/or a signal to interference and noise ratio (SINR) at the receiving station.

2. The method of claim 1, wherein:
    the first portion of the first data and the second portion of the first data are complementary portions of the first data; and/or
    the first portion of the second data and the second portion of the second data are complementary portions of the second data.

3. The method of claim 1, wherein:
    the first data is, or corresponds to, a combination of the first portion of the first data and the second portion of the first data; and/or
    the second data is, or corresponds to, a combination of the first portion of the second data and the second portion of the second data.

4. The method of claim 1, wherein at least one or each of the size(s) depends monotonically and/or linearly on the SNR or the SINR.

5. The method of claim 4:
    wherein:
        the size of the second portion of the first data is, or tends to be, zero if the SNR or the SINR is, or tends to be, equal to a first threshold value; and
        the size of the second portion of the first data monotonically and/or linearly increases as a function of the SNR or the SINR being greater than the first threshold value and/or less than a second threshold value; and/or
    wherein:
        the size of the first portion of the first data is, or tends to be, zero if the SNR or the SINR is, or tends to be, equal to the second threshold value; and
        the size of the first portion of the first data monotonically and/or linearly decreases as a function of the SNR or the SINR being greater than the first threshold value and/or less than the second threshold value.

6. The method of claim 1, further comprising:
    encoding a first data unit, the first data comprising a first codeword resulting from the encoding of the first data unit; and/or
    encoding a second data unit, the second data comprising a second codeword resulting from the encoding of the second data unit.

7. The method of claim 1, wherein the transmitting further comprises transmitting, on the first intra-symbol layer of the multi-intra-symbol-layer transmission, a first portion of third data and, simultaneously on the second intra-symbol layer of the multi-intra-symbol-layer transmission, a second portion of the third data and, simultaneously on a third intra-symbol layer of the multi-intra-symbol-layer transmission, a third portion of the first data and a third portion of the second data and a third portion of the third data.

8. The method of claim 7:
    wherein the transmission of the first data is an initial transmission or a retransmission; and/or
    wherein the transmission of the second data is an initial transmission or a retransmission; and/or
    wherein the transmission of the third data is an initial transmission or a retransmission.

9. The method of claim 7, wherein the multi-intra-symbol-layer transmission on the radio frequency is subject to an access protocol for shared access to the radio frequency; the access protocol comprising a back-off mechanism for deferring the multi-intra-symbol-layer transmission based on a contention window, which is maintained or not increased if the feedback message from the receiving station is indicative of a positive acknowledgement for the first data, the second data, and/or the third data.

10. The method of claim 1, further comprising receiving a feedback message from the receiving station.

11. The method of claim 10, wherein a size of the first portion of the first data and a size of the second portion of the first data are determined or changed by increasing the size of one of the size of the first portion of the first data and the size of the second portion of the first data, and decreasing the size of the other of the size of the first portion of the first data and the size of the second portion of the first data depending on the feedback message from the receiving station.

12. The method of claim 10:
wherein the feedback message is indicative of the SNR and/or the SINR at the receiving station;
wherein the method further comprises:
retransmitting to the receiving station in response to the feedback message, if the feedback message is indicative that decoding of the first data was not successful by an amount of missing information or if the feedback message is indicative of a non-positive or negative acknowledgment (NACK) for the first data wherein an amount of missing information for successfully decoding of the first data being estimated based on the SNR or the SINR, a portion of the first data using the first intra-symbol layer, the second intra-symbol layer, and/or a third intra-symbol layer of the multi-intra-symbol-layer transmission.

13. The method of claim 12, wherein a size of the retransmitted portion of the first data depends on a code, a code length, or a correlation length of the code used for encoding a first data unit resulting in the first data.

14. The method of claim 12, further comprising:
estimating the amount of missing information for successfully decoding of the first data based on the SNR or the SINR compared to a first threshold value, a second threshold value, and/or a third threshold value.

15. The method of claim 12, wherein the retransmitted portion comprises or is based on the second portion of the first data and/or the size of the retransmitted portion is equal to or less than the size of the second portion of the first data, if the SNR or the SNIR is greater than a first threshold value and/or less than a second threshold value.

16. A method of performing a multi-intra-symbol-layer reception from a transmitting station at a receiving station on a radio frequency, wherein each of a plurality of intra-symbol layers of a same modulation symbol has different robustnesses on the radio frequency, the method comprising:
receiving, on a first intra-symbol layer of the multi-intra-symbol-layer reception, a first portion of first data and a first portion of second data and, simultaneously on a second intra-symbol layer of the multi-intra-symbol-layer reception, a second portion of the first data and a second portion of the second data;
wherein a size of the first portion of the first data, the second portion of the first data, the first portion of the second data, and/or the second portion of the second data depends on a signal to noise ratio (SNR) and/or a signal to interference and noise ratio (SINR) at the receiving station.

17. The method of claim 16, further comprising decoding each codeword for an individual intra-symbol layer; wherein decoding comprises, when at least one of the codewords is decoded successfully, soft values for the one or more other codewords are computed using the successfully decoded codeword as additional information.

18. The method of claim 17, wherein the same codeword is received on two or more intra-symbol layers; and wherein, at the receiving station, the information obtained from the two or more intra-symbol layers are combined when performing the decoding.

19. A transmit device for performing a multi-intra-symbol-layer transmission from a transmitting station to a receiving station on a radio frequency, wherein each of a plurality of intra-symbol layers of a same modulation symbol has different robustnesses on the radio frequency, the transmit device comprising:
processing circuitry;
memory containing instructions executable by the processing circuitry whereby the transmit device is operative to:
transmit, on a first intra-symbol layer of the multi-intra-symbol-layer transmission, a first portion of first data and a first portion of second data and, simultaneously on a second intra-symbol layer of the multi-intra-symbol-layer transmission, a second portion of the first data and a second portion of the second data;
wherein a size of the first portion of the first data, the second portion of the first data, the first portion of the second data, and/or the second portion of the second data depends on a signal to noise ratio (SNR) and/or a signal to interference and noise ratio (SINR) at the receiving station.

20. A receive device for performing a multi-intra-symbol-layer reception from a transmitting station at a receiving station on a radio frequency, wherein each of a plurality of intra-symbol layers of a same modulation symbol has different robustnesses on the radio frequency, the receive device comprising:
processing circuitry;
memory containing instructions executable by the processing circuitry whereby the receive device is operative to:
receive, on a first intra-symbol layer of the multi-intra-symbol-layer reception, a first portion of first data and a first portion of second data and, simultaneously on a second intra-symbol layer of the multi-intra-symbol-layer reception, a second portion of the first data and a second portion of the second data;
wherein a size of the first portion of the first data, the second portion of the first data, the first portion of the second data, and/or the second portion of the second data depends on a signal to noise ratio (SNR) and/or a signal to interference and noise ratio (SINR) at the receiving station.

* * * * *